US007265893B2

(12) United States Patent
Hughes et al.

(10) Patent No.: US 7,265,893 B2
(45) Date of Patent: Sep. 4, 2007

(54) OASLM AND A METHOD AND APPARATUS FOR DRIVING AN OASLM

(75) Inventors: Jonathan Rennie Hughes, Malvern (GB); Stuart David Coomber, Malvern (GB); Carl Vernon Brown, Nottingham (GB); Alexander John Topping, Oxford (GB)

(73) Assignee: Qinetiq Limited, London (GB)

( * ) Notice: Subject to any disclaimer, the term of this patent is extended or adjusted under 35 U.S.C. 154(b) by 0 days.

(21) Appl. No.: 10/531,080

(22) PCT Filed: Oct. 6, 2003

(86) PCT No.: PCT/GB03/04299

§ 371 (c)(1),
(2), (4) Date: Apr. 8, 2005

(87) PCT Pub. No.: WO2004/034137

PCT Pub. Date: Apr. 22, 2004

(65) Prior Publication Data

US 2005/0286117 A1    Dec. 29, 2005

(30) Foreign Application Priority Data

Oct. 9, 2002    (GB) .................................. 0223396.3

(51) Int. Cl.
*G02B 26/00* (2006.01)
(52) U.S. Cl. .................. 359/295; 359/315; 359/244
(58) Field of Classification Search ................ 359/255, 359/290, 291, 292, 295, 315, 316, 244, 299; 369/53.11; 349/41, 49; 345/210
See application file for complete search history.

(56) References Cited

U.S. PATENT DOCUMENTS

| 5,130,830 A | * | 7/1992 | Fukushima et al. ......... 349/123 |
| 5,555,115 A | | 9/1996 | Mitsuoka et al. |
| 5,617,203 A | | 4/1997 | Kobayashi et al. |
| 5,912,758 A | | 6/1999 | Knipe et al. |

FOREIGN PATENT DOCUMENTS

EP    0 525 424    2/1993

(Continued)

OTHER PUBLICATIONS

Fukushima, et al. "Ferroelectric liquid-crystal spatial light modulator achieving biopolar image operation and cascadability", Applied Optics, pp. 6859-6868 (1992).

(Continued)

*Primary Examiner*—Hung Dang
*Assistant Examiner*—Joseph Martinez
(74) *Attorney, Agent, or Firm*—Marger Johnson & McCollom, P.C.

(57) ABSTRACT

A method of controlling the switching of an optically addressable spatial light modulator (OASLM), to a first surface of which a write light signal is applied and to a second surface of which a read light signal is applied. The method comprises applying a bipolar switching waveform to control electrodes of the (OASLM) during each write cycle such that the leading pulse of the waveform applies a voltage across the (OASLM) which is in the photosensitive direction and the trailing pulse applies a voltage which is not in the photosensitive direction.

21 Claims, 18 Drawing Sheets

FOREIGN PATENT DOCUMENTS

GB    2 269 238    2/1994
JP    5027256    2/1993

OTHER PUBLICATIONS

Yim et al., "Comparison of operation parameters between binary and analogue switching pixellated light valves", IEEE, pp. 236-242 (1998).

Perennes et al., "Optimization of ferroelectric liquid crystal optically addressed spatial light modulator performance", Opt. Eng., pp. 2294-2301 (1997).

Moddel, "Ferroelectric liquid crystal spatial light modulators", Spatial Light Modulator Technology: materials, devices and applicaitons, pp. 287-360 (1995).

* cited by examiner

3D Image

Electrodes Connect to ITO Conductive Layers

OASLM AND A METHOD AND APPARATUS FOR DRIVING AN OASLM

BACKGROUND OF THE INVENTION

1. Field of Invention

The present invention relates to optically addressable spatial light modulators and to a method and apparatus for driving optically addressable spatial light modulators. The present invention also relates to holographic displays comprising optically addressable spatial light modulators.

2. Description of the Art

It is well known that a three-dimensional image may be presented by forming an interference pattern or hologram on a planar surface. The three-dimensional image is visible when the hologram is appropriately illuminated. Recently, interest has grown in so-called computer generated holograms (CGHs) which offer the possibility of displaying high quality images, which need not be based upon real objects, with appropriate depth cues and without the need for viewing goggles. Interest is perhaps most intense in the medical and design fields where the need for realistic visualisation techniques is great. Typically, a computer generated hologram involves the generation of a matrix of data values (each data value corresponding to a light transmission level) which simulates the hologram which might otherwise be formed on a real planar surface. An important component of the CGH system is an optically addressed spatial light modulator (OASLM). This device comprises a photosensor layer, typically silicon (Si), and a liquid crystal (LC) layer with electrodes by which a voltage is applied across both layers. When a pattern of light of appropriate wavelength is incident onto the photosensor its resistance falls and allows most of the applied voltage to drop across the LC which is then switched in those areas which are illuminated A light beam incident on the front of the LC layer is then modulated by the LC and reflected from the Si (or from an incorporated mirror) in such a way that an image is presented to a viewer.

A holographic display system employing CGHs is described in GB2330471A and is further illustrated in FIG. 1. The illustrated approach is known as Active Tiling™, and involves the use of a relatively small Electrically Addressable Spatial Light Modulator (EASLM) 1 in combination with a relatively large Optically Addressable Spatial Light Modulator (OASLM) 2. The holographic matrix (CGH) is subdivided into a set of sub-holograms, with the data for each sub-hologram being passed in turn to the EASLM 1. The EASLM 1 is illuminated from one side with incoherent light 3. The OASLM 2 comprises a sheet of liquid crystal (in one example the liquid crystal is a bistable ferroelectric liquid crystal) which is switched from a first to a second state by a suitable voltage in the presence of incident light In one method, Guide optics 4, which may include a shutter, disposed between the EASIM 1 and the OASLM 2, cause the output of the BASLM 1 (i.e. light transmitted through the EASIM 1) to be stepped across the surface of the OASLM 2. The bistable nature of the OASLM liquid crystal means that the portion or "tile" 5 of the OASLM 2 onto which a sub-holographic image is projected and appropriate switching voltage applied, remembers that image until such time as the OASLM is reset by the application of an electrical voltage. It will be appreciated that, when all of the component images have been written to the OASLM, the OASLM will have "stored" in it a replica of the complete holographic matrix. The image may be replayed by a coherent beam incident 6 on the LC. When the next holographic image is ready to be transferred to the OASLM a reset voltage is applied to remove the existing image from the OALSM and prepare it for loading the next image. The holographic display also typically comprises a large output lens, although this is not shown in FIG. 1.

The structure of a typical OASLM is illustrated in FIG. 2 and a simplified equivalent circuit is shown in FIG. 3. In this circuit the voltage is applied to the Si side of the device and the LC side is earthed. This convention will be followed throughout the following discussion. From left to right in FIG. 2, the layers are as follows; a first glass layer 1, an indium tin oxide layer 2 which forms a first transparent electrode, a silicon photosensor layer 3, a light blocking layer 4, a mirror 5, a first alignment layer 6 which may be formed by brushing a polyimide layer, a liquid crystal (LC) layer 7, a second alignment layer 8, a second indium tin oxide layer 9, and a second glass layer 10. A voltage source 11 is coupled to the two indium tin oxide layers 2, 9 in order to control the switching of the OASLM. The silicon-indium tin oxide layer junction acts as a diode; when a voltage of a first positive polarity is applied across the device this diode is forward biased and most of the voltage will be dropped across the LC layer 7, whilst when a voltage of a second, negative polarity is applied across the device, most of the voltage will be dropped across the silicon layer 3 unless write light is applied in which case the voltage will be dropped across the LC layer 7. The bias of the second polarity is referred to as the "photosensitive direction". When the bias is in the photosensitive direction and with no illumination, the voltage appearing across the LC layer 7, $V_{lc}$, is given by the capacitive division of the total voltage appearing across the OASLM:

$$V_{lc} = C_{Si}/(C_{lc} + C_{Si}),$$

where $C_{Si}$ and $C_{lc}$ are the capacitances of the silicon and LC layers respectively. As charge is generated in the Si layer, so the voltage across the LC rises.

In the ideal case a Schottky barrier is formed in the OALSM by the silicon and indium-tin-oxide (ITO) transparent electrode. This gives behaviour some way between that of a photodiode and a photoconductor. If ohmic contacts are made then photoconductor behaviour results. The major problem with a pure photoconductor is the dark leakage current which is not sufficiently low to keep the voltage from dropping across the LC in a non-illuminated addressed state. A photodiode requires the deposition of p-doped, intrinsic and n-doped Si and is a complicated process. For a photodiode under reverse bias, when a photon is absorbed to produce an electron-hole pair in the Si, the hole and electron are separated and drift to the contacts. The blocking contacts stop the carriers so that once they are collected the response is complete. The photocurrent varies linearly with the light intensity over a wide range of intensities because one electron-hole pair is collected for each absorbed photon. With the application of a positive applied voltage the photodiode is forward biased so that all of the voltage should drop across the LC. The presence of a write light should not affect the state of the LC significantly, with a positive voltage applied. When a negative applied voltage is applied, the photodiode is reverse biased, blocking the current, so that ideally the voltage across the LC is unchanged. When a write light illuminates the photodiode a photocurrent charges the LC to a negative voltage and causes switching. This voltage is maintained across the LC until the drive voltage goes positive again.

For more details of the operating theory of spatial light modulators see, for example, "Spatial Light Modulator Technology, Materials, Devices and Applications", edited by U Efron, published by Marcel Dekker Inc. 1995 and "Optimisation of ferroelectric liquid crystal optically addressed spatial light modulator performance", Perennes F & Crossland W A, Opt. Eng. 36 (8) 2294-2301 (August 1997).

A typical voltage signal for controlling an OASLM is illustrated in FIG. 4. Prior to each write phase, a blanking pulse is applied to the device. The blanking pulse has a relatively large amplitude and duration and has a polarity in the opposite direction to the polarity of the photosensitive direction (i.e. positive). Typically, the whole device may be illuminated entirely with write light for the duration of the blanking pulse. The blanking pulse results in the molecules of the liquid crystal layer being oriented in a first direction. Each blanking pulse is followed by a write pulse which has a polarity in the photosensitive direction, the write pulse may be separated in time from the blanking pulse or may follow it immediately. There will usually be some means of DC balancing the blanking pulse and write pulse so that there is net zero DC, but this is not shown in the Figure. During a write pulse, the silicon side of the device is illuminated with the desired pattern. The result is that the applied voltage is dropped across the liquid crystal layer in those regions where the device is illuminated, causing the liquid crystal to switch to a second state. In non-illuminated regions of the device, the liquid crystal does not switch. The "switched" pattern in the liquid crystal is used to modulate a light beam incident on the liquid crystal side of the device.

Prior art drive waveforms are described in, for example "Optimisation of ferroelectric liquid crystal optically addressed spatial light modulator performance", Perennes F & Crossland W A, Opt. Eng. 36 (8) 2294-2301 (August 1997). In this example the erase pulse is immediately followed by a write pulse. This appears to be a simple bipolar pulse but it must be remembered that in fact it is two adjacent monopolar pulses of different polarity and different function, which may be separated in time. Applied Optics Vol. 31, No. 32, pp. 6859-6868, 10 Nov. 1992, describes both erase and write pulses which are bipolar. These may be applied with either polarity, i.e. leading part positive, training part negative, or vice versa, since the device used has ohmic contacts. The function of the bipolar pulse in this example is to maintain DC balance.

Whilst a write pulse having a polarity in the photosensitive direction will be most effective at switching illuminated areas of a device, there will be a tendency for non-illuminated areas to switch since they will receive a reduced voltage of the same polarity. Careful design of the write pulse (shape, amplitude and width) is therefore required in order to achieve maximum discrimination between switching of illuminated and non-illuminated regions. In addition, it is desirable to maximise the region of pulse amplitude-width space in which the device is operated in order to compensate for variations within the device, e.g. cell spacing, and in operating conditions, e.g. temperature. Furthermore it is desirable to maximise switching speed (minimise switching pulse width) in order that images may be updated rapidly, e.g. for frame sequential colour. The relative thicknesses of Si and LC layers also influence switching since this changes their capacitance and thus the proportion of voltage appearing across the LC due to capacitive division of voltage. These parameters will affect the switching characteristic of the OALSM although not that of the LC. All of these parameters need to be optimised.

SUMMARY OF THE INVENTION

It is an object of the present invention to increase the range of pulse amplitude-widths within which appropriate discrimination between switching of illuminated and non-illuminated regions is achieved whilst maintaining or improving switching speed.

When the OASLM is used in a holographic display system, particularly an Active Tiling™ system, the resolution of the written image is important. It has been shown (G Moddel, "Ferroelectric liquid crystal spatial light modulators", Spatial Light Modulator Technology: materials, devices and applications, E Effron ed., pp. 287-360, Marcel Dekker Inc., New York, 1995) that the product of image size and viewing volume is proportional to the number of pixels contained in the computer generated hologram. Pixels of the order of 10 µm in the OASLM are required. It is a further object of the present invention to improve or maintain the discrimination between switched and non-switched areas of LC as the size of the pixel is reduced.

According to a first aspect of the present invention there is provided a method of controlling the switching of an optically addressable spatial light modulator (OASLM), to a first surface of which a write light signal is applied and to a second surface of which a read light signal is applied, the method comprising:

applying a bipolar switching waveform to control electrodes of the OASLM during each write cycle such that the leading pulse of the waveform applies a voltage across the OASLM which is in the photosensitive direction and the trailing pulse applies a voltage which is not in the photosensitive direction.

Preferably, the shape and amplitude of the bipolar pulse are such that the trailing pulse causes switching between stable states, whilst the leading pulse causes substantially no switching between stable state. This switching between stable states is known as "latching".

The switching waveform may have an asymmetric shape. In particular, the leading and trailing pulses may have different amplitudes and/or durations. More preferably, the duration of the leading pulse is less than that of the trailing pulse and/or the amplitude of the leading pulse is less than that of the trailing pulse.

By appropriately selecting the pulse shapes, the amplitudes of the pulses can be reduced and/or the size of the operating window in the voltage—time plane of the switching characteristic can be increased. A lower operating voltage has many advantages including simpler and lower-cost drive chips, increased device lifetime and lower power consumption, whilst a widening of the operating window eases constraints on device parameters such as uniformity of cell spacing (leading to variations in electric field), temperature variation within the device, and varying distortions of the applied voltage pulse in different areas of the device due to resistance and capacitance in the device.

Preferably, the pulse width ratio between the leading pulse and the trailing pulse is at least 1:4, more preferably at least 1:10. Alternatively or in addition the relative amplitudes of the leading and trailing pulses may be varied to optimise switching discrimination.

In this first aspect of the invention the OASLM used may operate as a photodiode having a blocking contact and asymmetric current-voltage response.

According to a second aspect of the present invention there is provided a method of controlling the switching of an optically addressable spatial light modulator (OASLM), to a first surface of which a write light signal is applied and to a second surface of which a read light signal is applied, the method comprising:

applying a bipolar switching waveform to control electrodes of the OASLM during each write cycle, one of the pulses of the switching waveform causing illuminated areas of the OASLM to substantially switch from a first to a second state whilst causing substantially no switching of unilluminated areas, and the other pulse of the bipolar waveform causing unilluminated areas of the OASLM to substantially switch from the second to the first state whilst causing substantially no switching of illuminated areas.

The amplitudes and widths of the waveform pulses are selected to ensure switching of illuminated and unilluminated areas of the OASLM to different states. More preferably, the pulse amplitudes and widths are chosen to lie within that region of pulse amplitude/width space which is substantially bounded by:

a) a line defining between 95% and 100% switching of illuminated areas to said first pulse of the bipolar waveform; and b) a line defining between 0% and 5% switching of unilluminated areas to said second pulse of the bipolar waveform.

or a) a line defining between 95% and 100% switching of unilluminated areas to said first pulse of the bipolar waveform; and b) a line defining between 0% and 5% switching of illuminated areas to said second pulse of the bipolar waveform.

In certain embodiments of the present invention, each bipolar switching waveform is preceded by a blanking pulse which causes switching of the entire OASLM to either said first or second state. During the blanking pulse said first side of the OASLM may be completely illuminated. However, providing that the switching discrimination of the leading and trailing pulses of the switching waveform is sufficient, the blanking pulse is not necessary.

In this second aspect of the invention the device may operate as either a photodiode or a photoconductor.

According to a third aspect of the present invention there is provided a method of controlling the switching of an optically addressable spatial light modulator (OASLM), to a first surface of which a write light signal is applied and to a second surface of which a read light signal is applied, the method comprising:

applying an asymmetric bipolar switching waveform to control electrodes of the OASLM during each write cycle.

According to a fourth aspect of the present invention there is provided an optically addressable spatial light modulator (OASLM) which in use is arranged to have a write light signal applied to a first surface thereof and a read light signal applied to a second surface thereof the OASLM comprising:

a ferroelectric liquid crystal which gives the OASLM device a response time for switching between the first and second states which depends upon the voltage applied across the OASLM and the response time having a minimum value at a given voltage.

In this fourth aspect of the invention the device may operate either a photodiode or a photoconductor. In use, the switching pulse may be monopolar or bipolar. Where the switching pulse is monopolar, the pulse preferably causes unilluminated areas to switch and does not switch illuminated areas Where the switching pulse is bipolar, the leading part of the bipolar pulse preferably causes switching in the latching direction and the trailing part does not switch in the opposite direction.

The use of a ferroelectric liquid crystal (FLC) mixture having a minimum response time for switching at a particular voltage (a $\tau v_{min}$ mixture), provides for a large operating region in the voltage-time plane which can be accessed at voltages higher than that for minimum pulse width. It should be noted that at voltages higher than the voltage for the minimum pulse width and at a particular pulse width, discrimination between a switching and a non-switching voltage occurs when the lower voltage switches and the higher voltage does not switch. Hence in this mode of operation the un-illuminated areas of the OALSM switch while the illuminated areas do not switch.

The various aspects of the invention described above may be combined to provide an OASLM system which has low voltage requirements and which operates with appropriate discrimination over a range of operating conditions and over a range of device tolerances with short pulse widths.

Other aspects of the invention relate to display systems employing the above methods and are defined in the attached claims.

DESCRIPTION OF THE FIGURES

For a better understanding of the present invention and in order to show how the same may be carried into effect reference will now be made, by way of example, to the accompanying drawings, in which.

DESCRIPTION OF A PREFERRED EMBODIMENT

Figure 1:
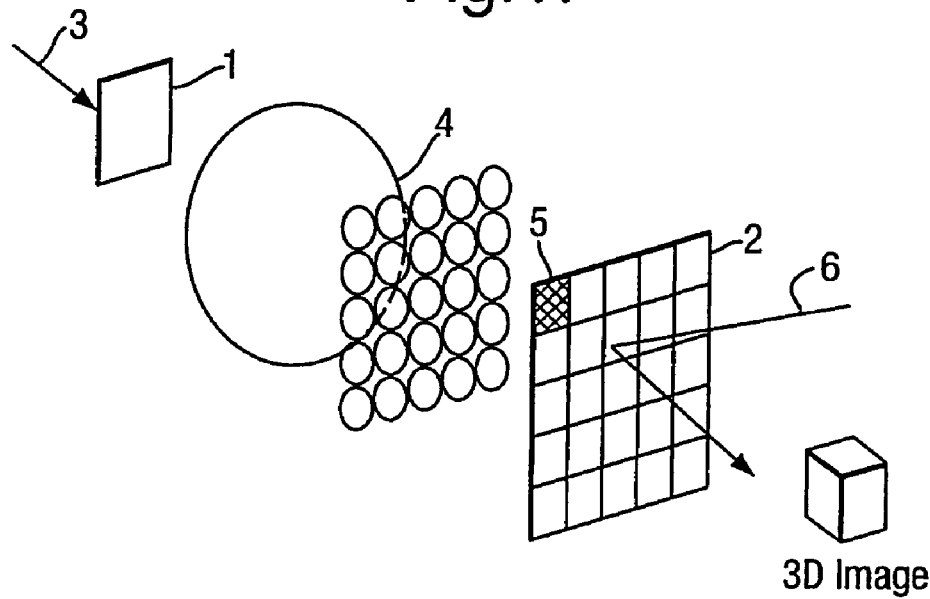
FIG. 1 illustrates schematically an Active Tiling™ holographic display system.
Figure 2:
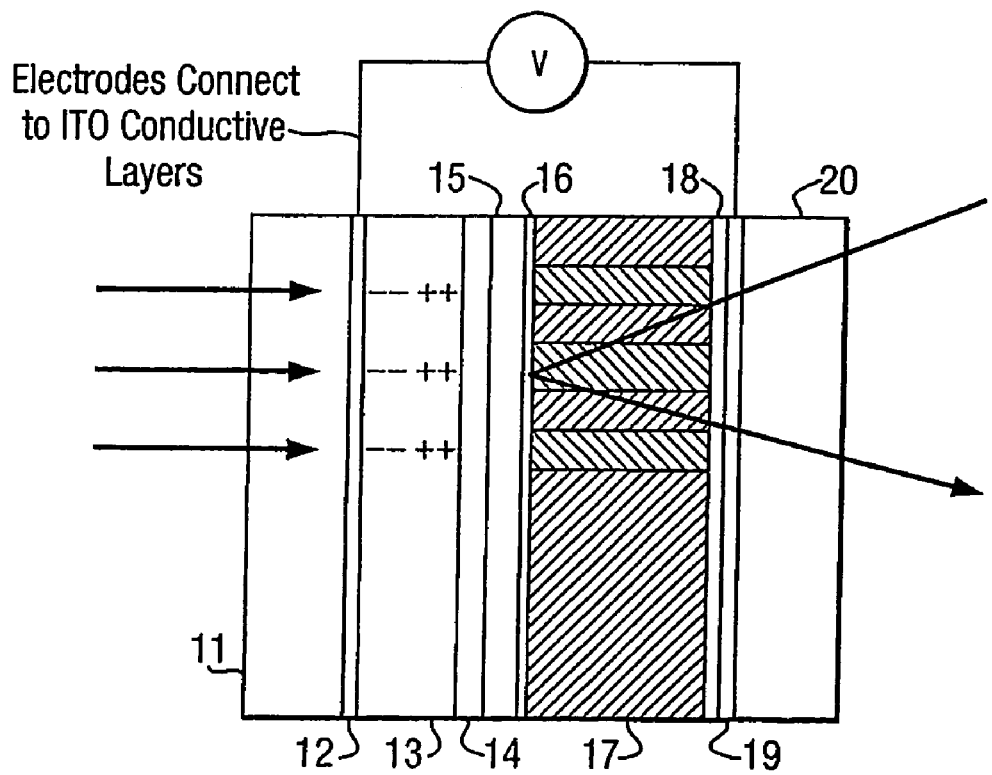
FIG. 2 illustrates schematically an OASLM of the display system of FIG. 1.
Figure 3:
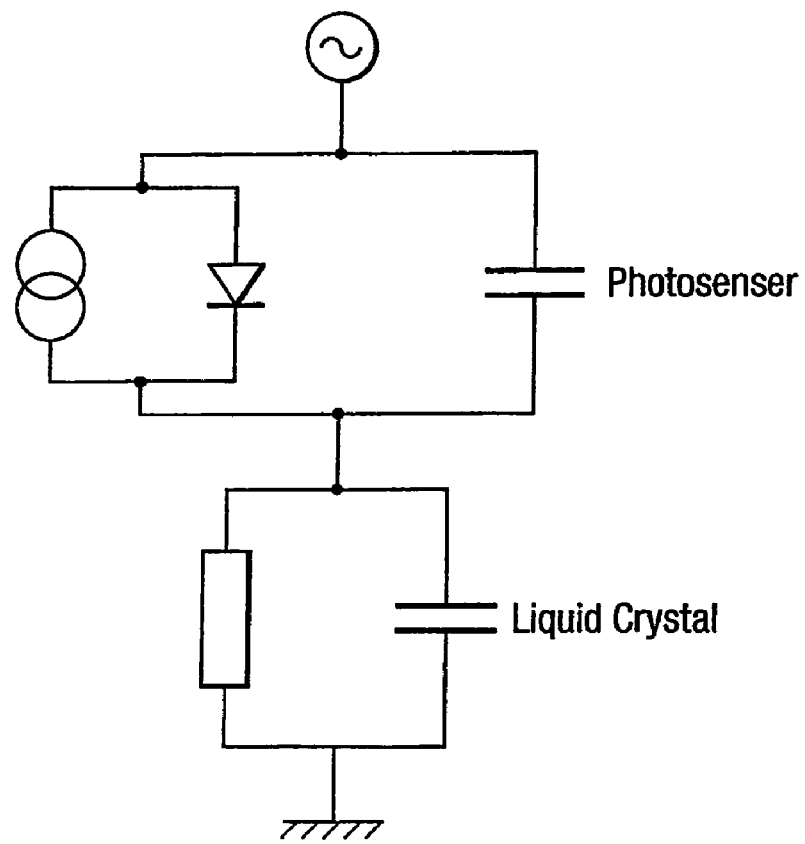
FIG. 3 illustrates a simplified equivalent circuit of the OASLM of FIG. 2.
Figure 4:
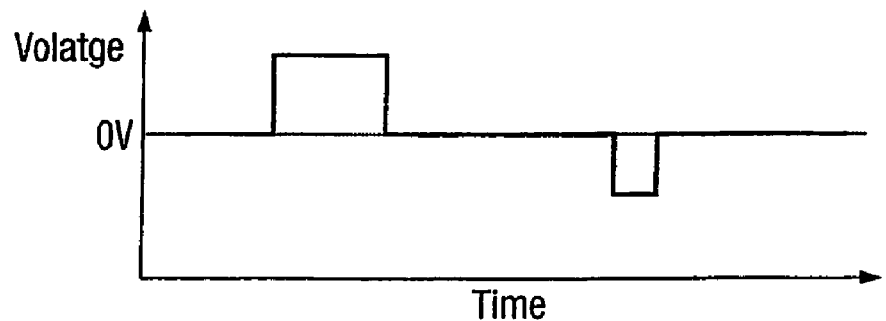
FIG. 4 illustrates a typical control signal applied to the OASLM of FIG. 2.

The structure of a typical OASLM has been described above with reference to FIG. 2. Such an OASLM may be used in the Active Tiling holographic display system of FIG. 1, in other types of holographic display systems, or indeed in other systems and applications not related to holography. The following discussion is concerned with the selection of a suitable control signal for application to OASLM to cause the write illumination pattern to be "written" to the device, so that the pattern can subsequently be read out from the device by the application of a read light.

Figure 5:
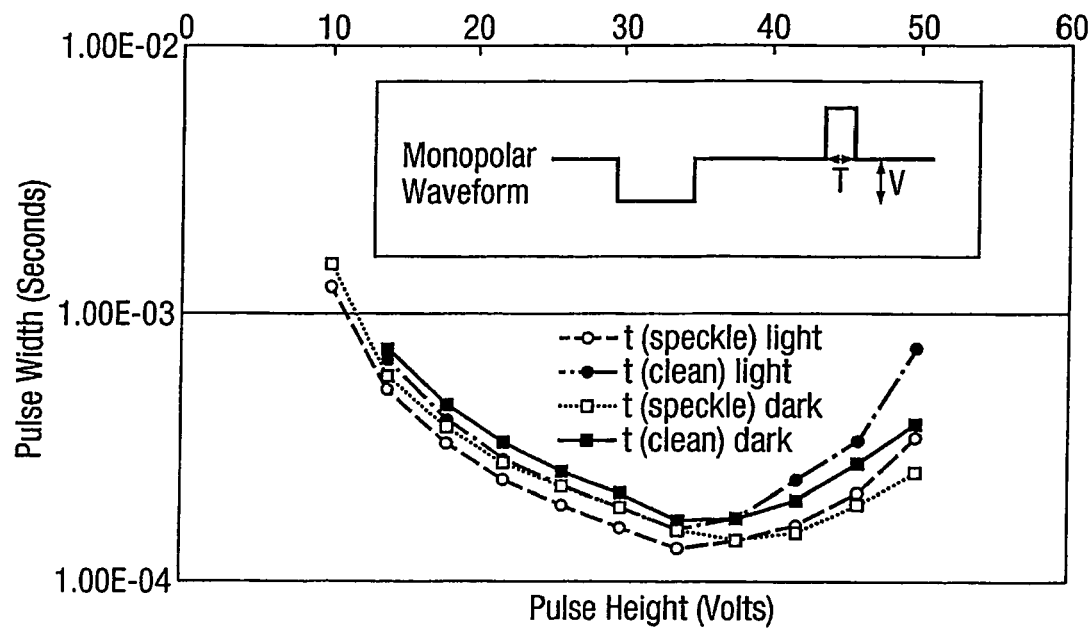
FIG. 5 illustrates a switching waveform sequence of the prior art for application to an OASLM.

FIG. 5 illustrates a switching waveform of the prior art and its switching effect on an FLC OASLM (The cell has a 1.5 µm spaced LC region containing a mixture of 50% SCE8 and 50% SCE8R (racemic) available from Clariant Gmbh). The first pulse is a negative blanking pulse which switches all of the LC to one state. The switching pulse is monopolar and its applied polarity is positive, opposite to the photosensitive direction. Two sets of switching data are plotted, one each for the case where the LC is illuminated (light) and un-illuminated (dark), and for each set the point at which switching begins (speckle) and at which it is complete (clean). Switching takes place above the 'clean' line, no switching takes place below the 'speckle' line. The two sets of switching curves lie close together and it is not possible to find a voltage and time pulse-width which is within the switching region (above 'clean' switching line) for one case of illumination and outside the switching region (below 'speckle' switching line) for the other case of illumination.

Figure 6:
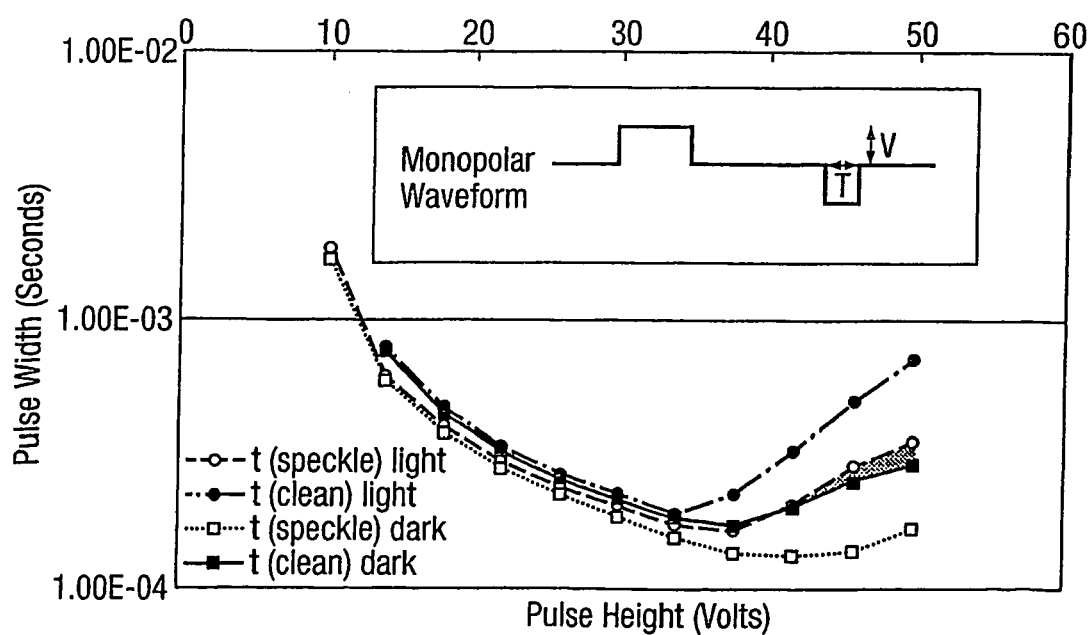
FIG. 6 illustrates an alternative switching waveform sequence of the prior art for application to an OASLM.

FIG. 6 shows the response when the switching pulse of the prior art is applied in the photosensitive direction. A region is identified and shown shaded in which switching only occurs when the cell is un-illuminated. This device uses a $\tau v_{min}$ FLC mixture in which discrimination occurs above $V_{min}$, i.e. where the lower voltage causes switching and the higher voltage does not switch, hence the unilluminated areas of the device switch.

FIGS. 5 and 6 show that the device is working as expected, i.e. the discrimination occurs when the bias is in the photosensitive direction.

Figure 7:
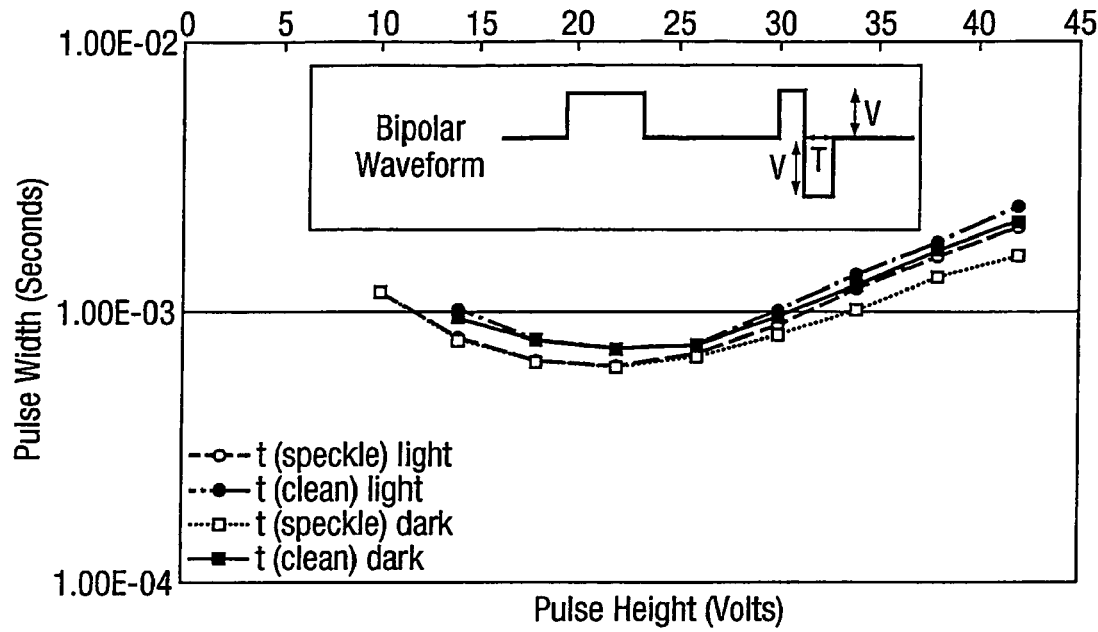
FIG. 7 illustrates an improved switching waveform sequence for application to an OASLM.

FIG. 7 shows a switching waveform using a (symmetric) bipolar pulse. This is described in the prior art (Applied Optics Vol. 31, No. 32, pp. 6859-6868, 10 Nov. 1992) where the OASLM used has ohmic contacts. When ohmic contacts are used the switching response is the same for either polarity of pulse. The device of our invention does not use ohmic contacts and this can be seen from the differing responses to pulses of each polarity in FIGS. 5 and 6, and 7 and 8.

Figure 8:
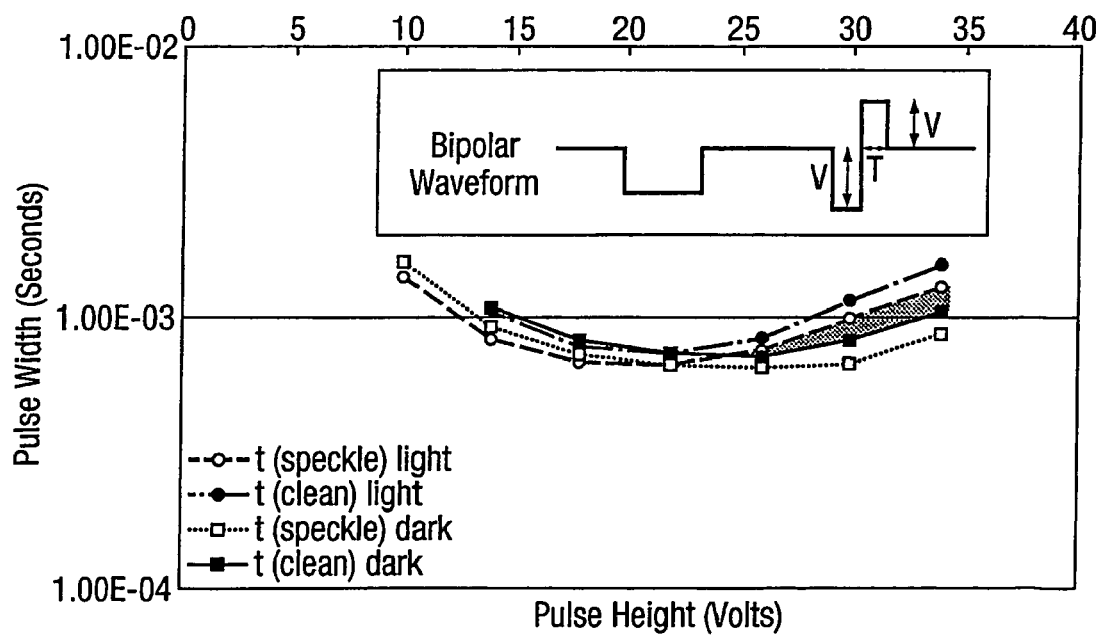
FIG. 8 illustrates an alternative improved switching waveform sequence for application to an OASLM.

In FIG. 7 the trailing part of the bipolar pulse, which is the part that causes switching, is in the photosensitive direction yet the switching curves lie close together and there is no discrimination to illumination. In FIG. 8 the trailing part of the bipolar pulse is not in the photosensitive direction yet an operating region of discrimination to illumination is identified and is shown shaded.

The effects of varying the shape of the bipolar switching waveform will now be considered. In particular the effects of making the bipolar waveform asymmetric will be considered.

Figure 9:
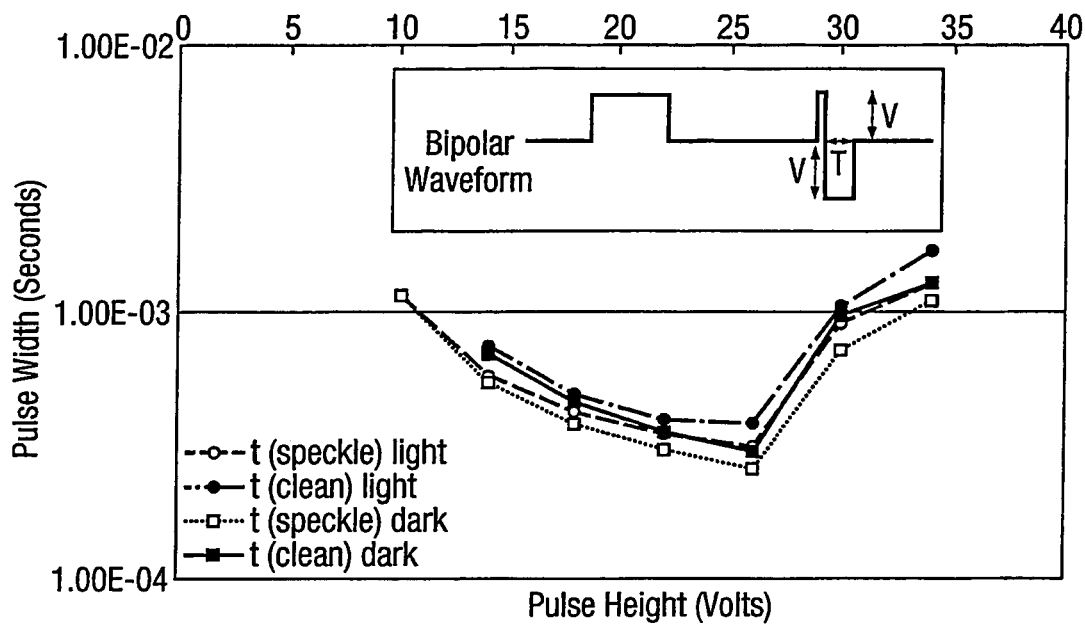
FIG. 9 illustrates a further alternative switching waveform sequence for application to an OASLM.
Figure 10:
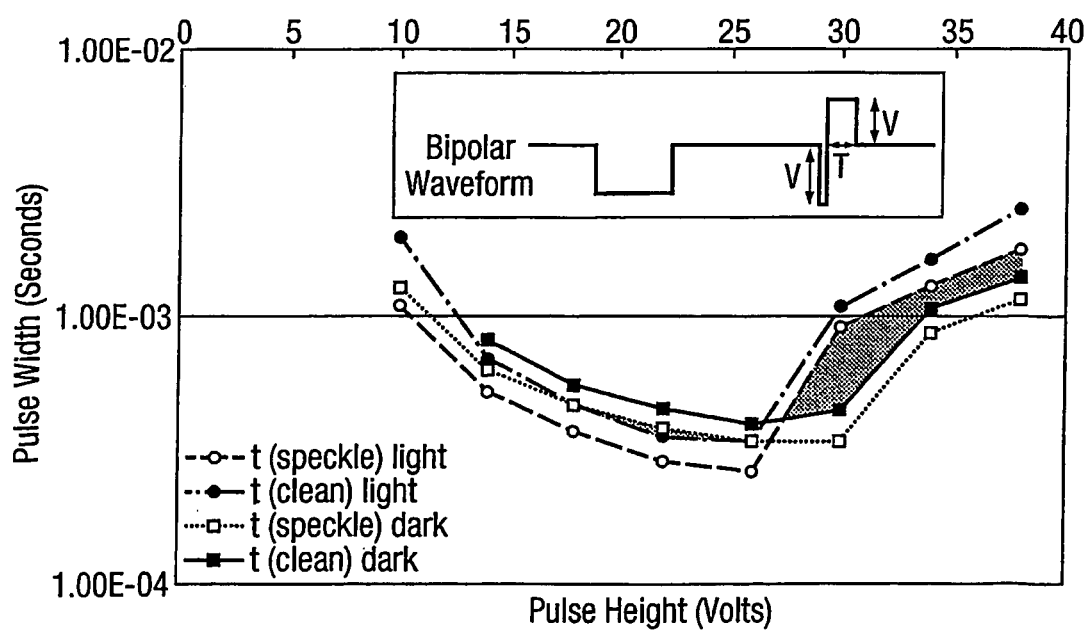
FIG. 10 illustrates a further alternative switching waveform sequence for application to an OASLM.

FIGS. 9 and 10 show an asymmetric bipolar pulse in which the leading part is one tenth the width of the trailing part. FIG. 9 shows that when the trailing part of the pulse is in the photosensitive direction there is no operating window, but if the trailing pulse is not in the photosensitive direction then an operating window does exist. This region is, again, shown shaded in FIG. 10. The operating window is larger than that identified in FIG. 8 where a symmetrical bipolar pulse was used. This operating window also occurs at shorter pulse widths (faster switching) than that of FIG. 8.

Figure 11:
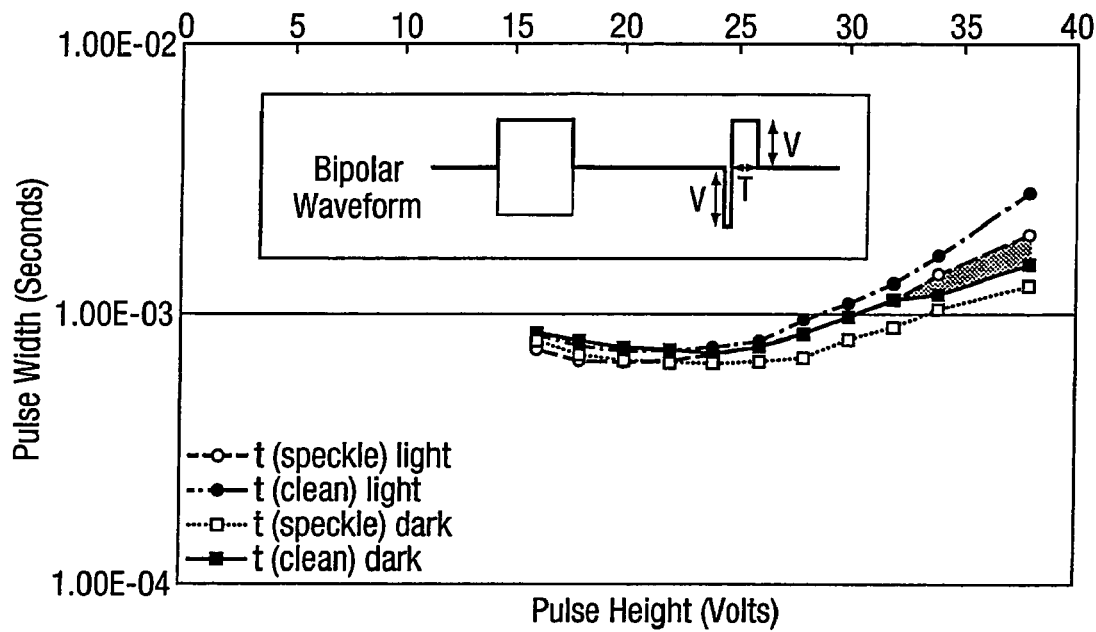
FIG. 11 illustrates two switching waveform sequences for application to an OASLM.
Figure 11:
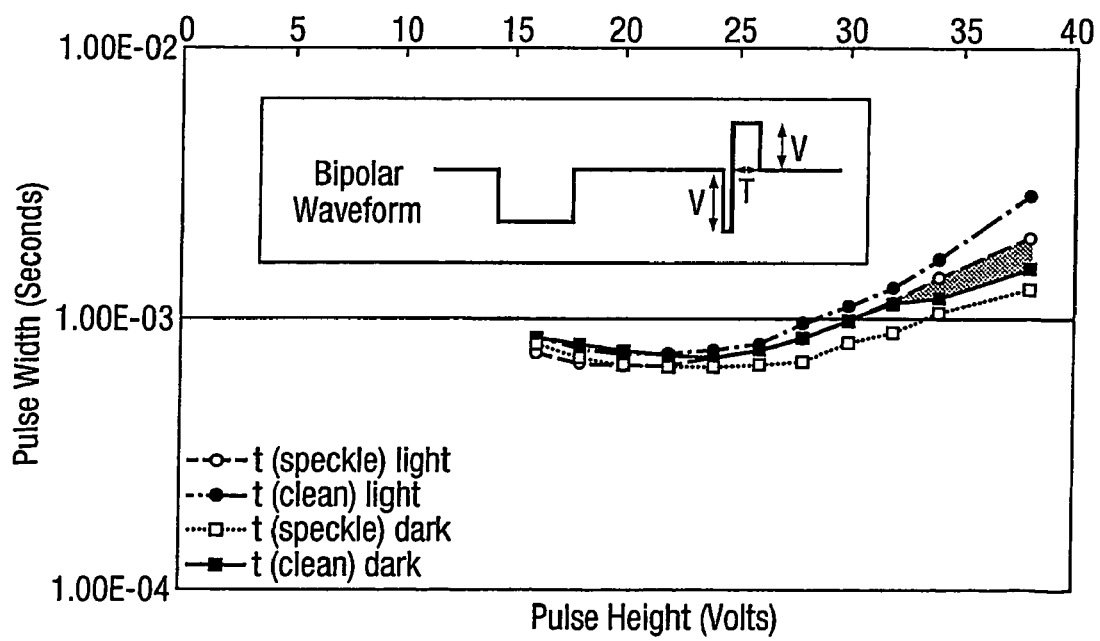

FIG. 11 shows the switching response of two asymmetric pulses where the leading pulse widths are a half and one third of the trailing pulse widths respectively. It can be seen that the operating range is comparable to that of FIG. 8 where a symmetrical bipolar pulse was used.

Figure 12:
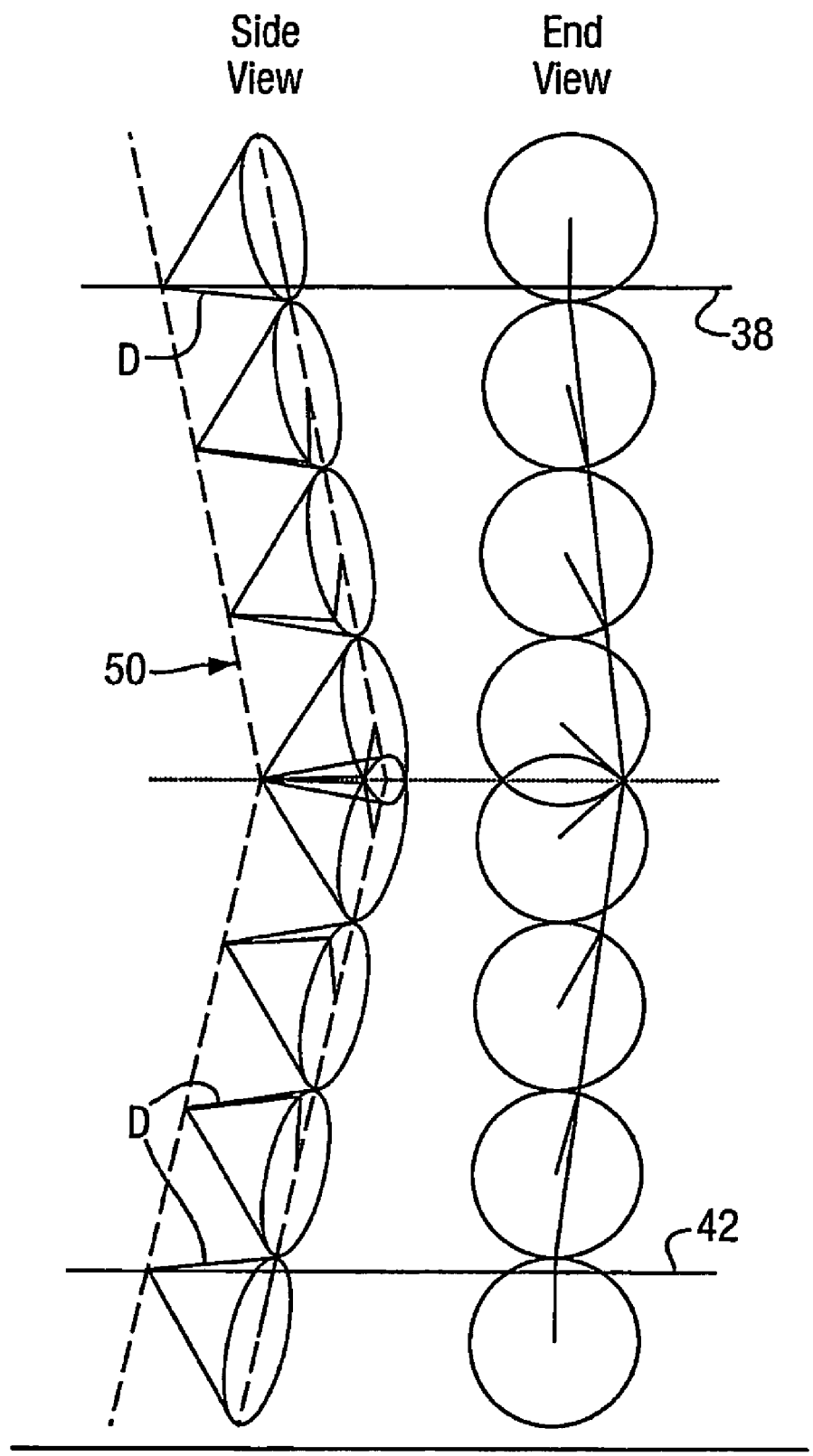
FIG. 12 shows a diagrammatic representation of side and end views of FLC molecules in a cell with thin spacing (such as that of FIG. 2) where 38 & 42 are cell walls, 50 is the smectic layer and D is the LC director.

The underlying mechanism which gives rise to the aforementioned results will now be explained. The FLC 7 is shown between the two alignment layers 6, 8 in FIG. 2. As a consequence of the rubbing applied to the two alignment layers strong anchoring forces hold the molecules at the substrates of the device, but at greater distances from the substrates the effect diminishes. In the smectic C* phase with C2 alignment the material is aligned in a plurality of chevron shaped layers. FIG. 12 shows one of these chevron layers. This Figure also shows a so-called end view of the layer for the sake of completeness. The actual configuration occurring between the substrates of the device is very complicated. The liquid crystal director lies at a position on the smectic cone that depends on the distance through the layer. A typical configuration is shown in FIG. 12 for the C2U alignment geometry. In the absence of any applied field there is a roughly linear variation in the twist of the director from its position at the bottom (top) of the cone at the upper (lower) surface to a maximum twist at the chevron interface. This structure is often referred to as the TDP or Twisted Director Profile.

When a field is applied to the structure a distortion of this director profile occurs. The exact profile of the director through the thickness of the layer then depends on many parameters, including the nature of the applied field (a.c. or d.c.), and the electrical, physical and elastic parameters of the liquid crystal material.

There are two stable positions at the chevron interface which are broadly determined by the value of the smectic cone and the tilt angle of the chevroned smectic layers. Certain orientations of the layer between crossed polarisers will give optical differences between the two states shown in the transmitted light intensity at a given wavelength A latching operation is said to result when an applied voltage waveform causes the director at the chevron interface to switch between these two stable positions.

The actual process by which the layer responds to a latching waveform is highly complicated and may involve a position dependent distortion of the director profile, distortion of the chevron layer profile, changes in the smectic cone angle, and the nucleation of 3d domain structures within the layer. However, the switching will be here described in terms of a highly simplified model in which the director is at the same position described by the angle phi on the smectic cone throughout the entirety of the FLC layer.

Figure 14:
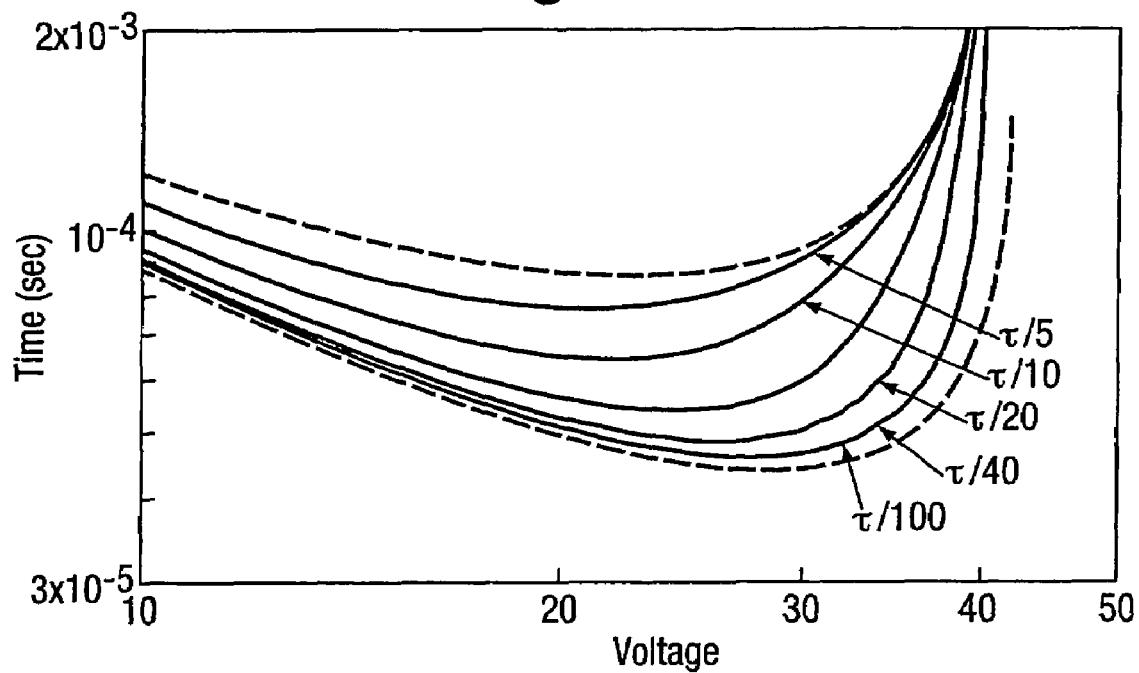
FIG. 14 illustrates the effect of varying the width of the leading part of a bipolar pulse on the switching response using a computer model in which the leading pulse is in the photosensitive direction.
Figure 15A:
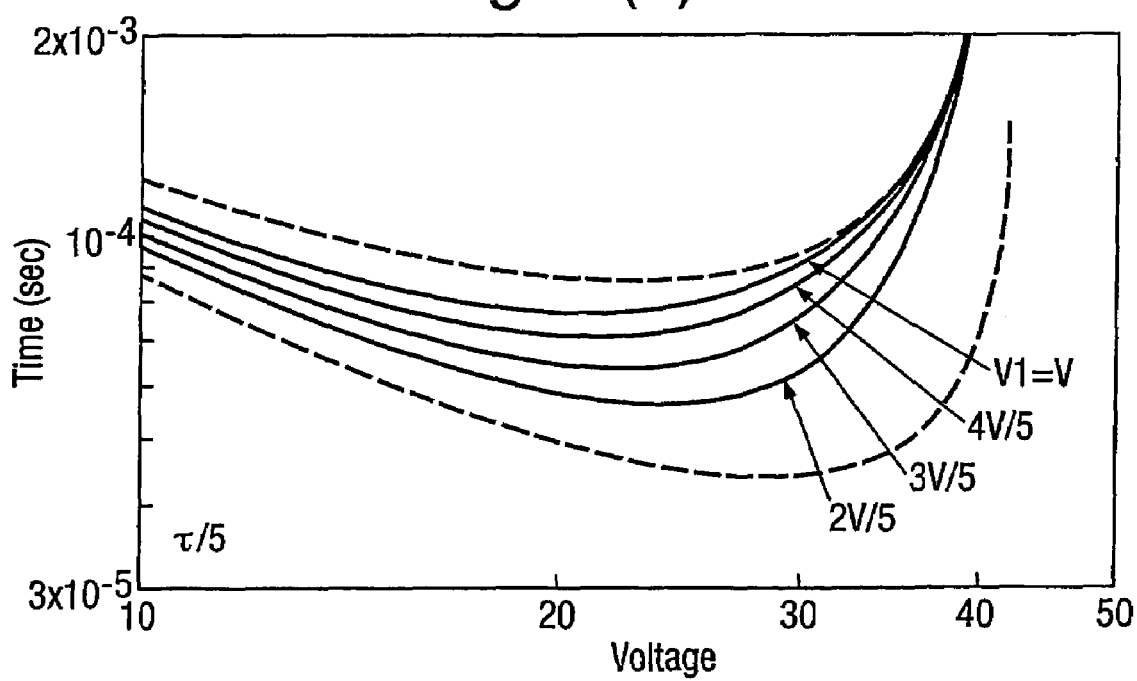
FIG. 15 illustrates the effect of varying the amplitude of the leading part of a bipolar pulse on the switching response with three different ratios of the width of the leading part to the trailing part using a computer model in which the leading pulse is in the photosensitive direction.
Figure 15B:
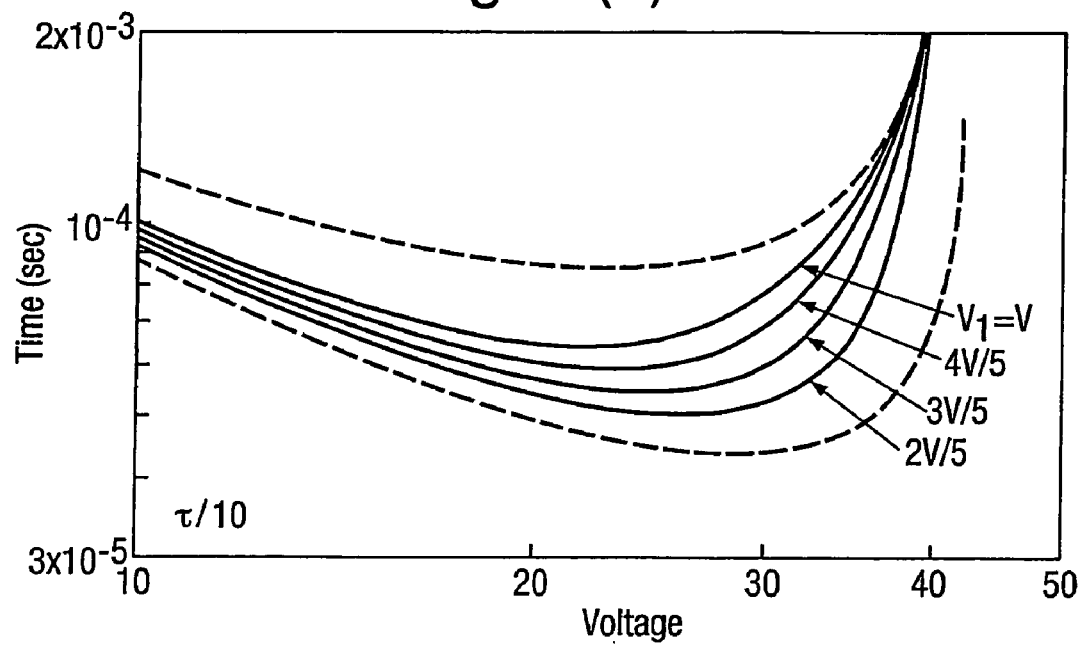
Figure 15C:
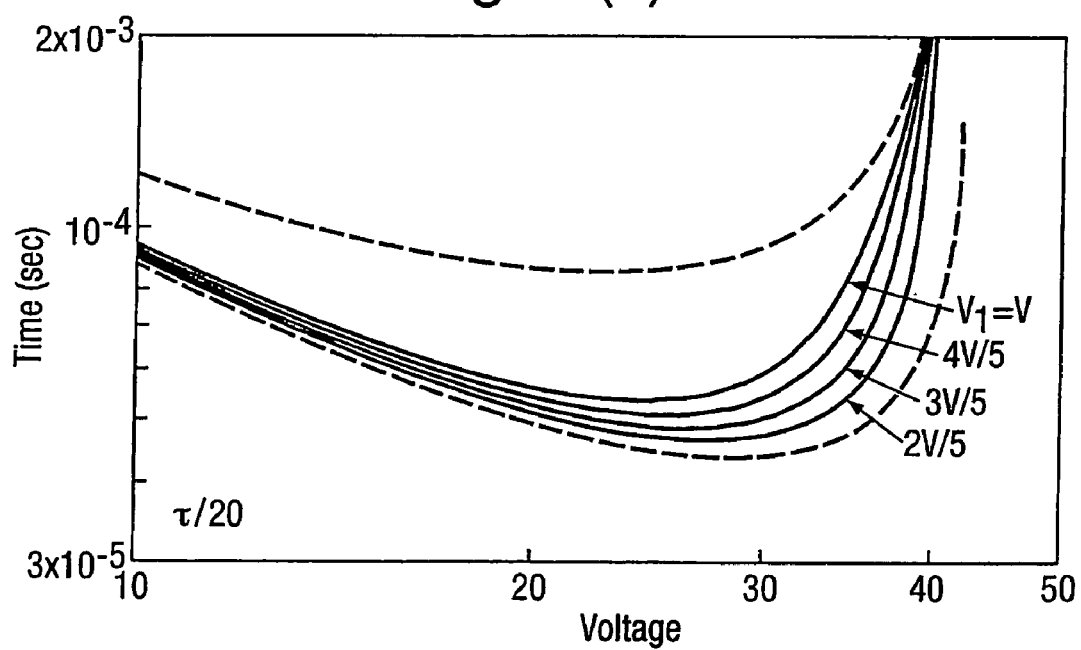

The simulation results shown in FIGS. 14 and 15 all make use of this model for the switching of the FLC layer and are based on the approach given in the paper by P. Maltese and R. Piccolo which appears in the Society of Information Display conference Digest 1993 on p642.

Figure 13A:
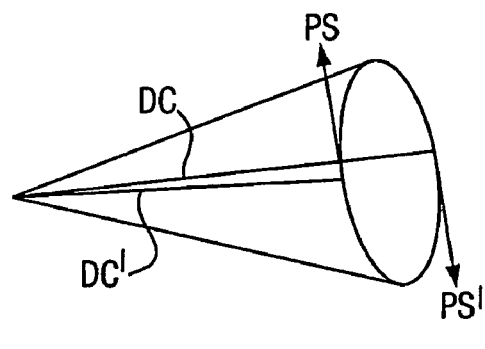
FIGS. 13A and 13B show a diagrammatic view of DC switched states and switching process for a ferroelectric liquid crystal.

FIG. 13A shows one of the switching cones around which the molecules (or director) of the FLC material can be thought to move. The Figure shows both of the possible fully-switched positions of the director DC and DC'. FLC devices switch as a result of a net DC field favouring one side of the cone. The polarisation directors of the molecules, $P_s$ and $P_s'$ respectively, are also shown. In practice, however, as will be discussed below, the director does not occupy these fully-switched positions.

Figure 13B:
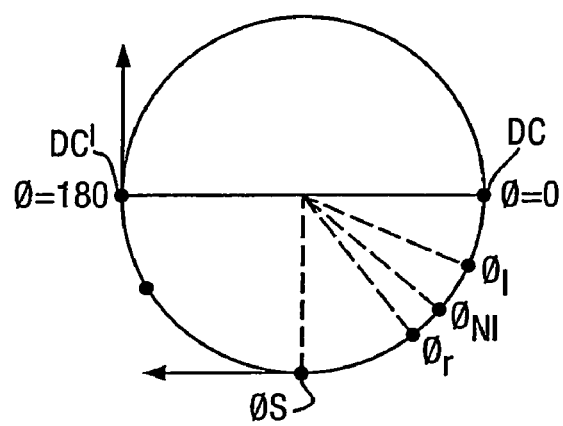

FIG. 13B shows a view of the cone from the end thereof (a so called 'plan view') showing some positions of the director around the cone between position DC and position DC'. Position DC is denoted at an angle of $\phi=0°$ and position DC' is denoted an angle of $\phi=180°$. Looking at the Figure, the director is assumed to rotate around the cone in a clockwise direction under the influence of an applied field of a certain polarity. However, the director of the LC molecules will only occupy the positions DC and DC' under the continued influence of an applied field of suitable polarity and sufficient magnitude. When such a field is not present the director relaxes around the cone away from the fully switched position to some extent. In this example the director starts from a relaxed position at an angle marked $\phi_r$. Once the director has been switched to the point $\phi_s$, exactly halfway between the fully switched positions DC and DC', it will continue to move naturally towards DC' (although it will eventually come to rest at $\phi_r'$) to complete the switching process (at which point the LC is said to be latched). Switching occurs when the electric field results in a net torque on the director tending to change $\phi$. The speed of the switching will depend on the magnitude of the torque and the total change in orientation through which the director moves.

Figure 13C:
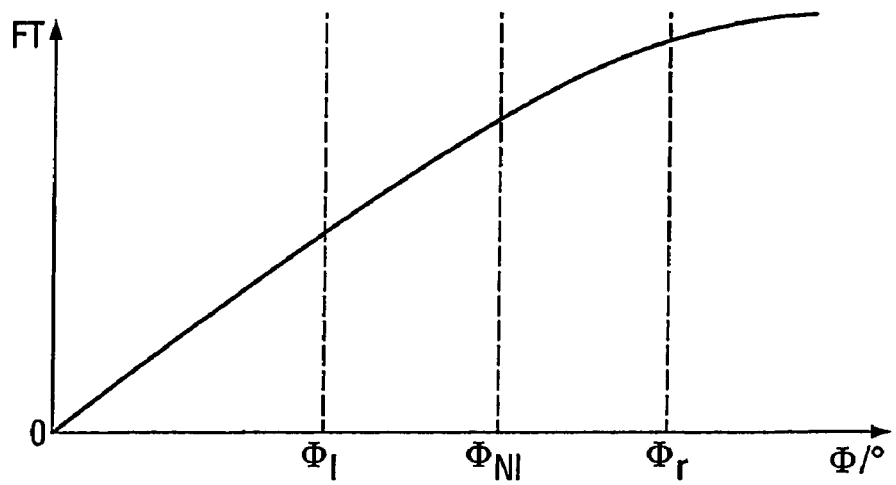
FIG. 13C shows a schematic graph illustrating the dependence of ferroelectric torque acting upon the director as a function of the director position shown in FIG. 13B.

The applied ferroelectric torque is dependent upon the position of the director around the cone as shown in FIG. 13C and is also linearly related to the magnitude and direction of the applied field for a particular director orientation. FIG. 13C shows that for a particular applied voltage the applied torque reduces as the director moves from the position $\Phi=90°$ towards $\Phi=0°$.

When the first part of a bipolar pulse, whose trailing part is chosen to switch the FLC, is applied to the director in its relaxed position, $\phi_r$, its effect will be to move the director towards the position $\phi=0$. When the trailing part of the pulse is applied a greater torque will then be required to switch from the new position closer to $\phi=0$. When an illumination pattern of write light is incident upon the device and the leading part of the pulse is in the photosensitive direction then there will be two new director positions taken up, $\phi_I$ and $\phi_{NI}$, for illuminated and non-illuminated respectively. Since in the illuminated areas there will be more voltage applied to the LC the director will move further towards $\phi=0$ in those areas. It turns out that these two different starting positions of the director, which lead to a lower ferroelectric torque being applied in the illuminated region, lead to greater discrimination for switching when the trailing pulse is not in the photosensitive direction than when the director has a common starting position and the trailing pulse is in the photosensitive direction.

It will be appreciated that if the leading pulse is too large in magnitude (voltage or pulse width or a combination of the two), it will result in both the illuminated and unilluminated areas tending towards a position $\phi=0$ and in this case there will be reduced discrimination and longer switching times.

Computer modelling of the switching response of an FLC has been carried out to show the effect of reducing the width or amplitude of the first part of a bipolar pulse. As mentioned above the simulation uses a simplified model for the switching of the FLC layer which follows the approach of Maltese and Piccolo. Results are shown in FIGS. 14 and 15. FIG. 14 shows the response of a bipolar pulse in which the leading part varies in width with respect to the trailing part. At the two extremes (indicated by broken lines) are the slowest pulse (symmetrical bipolar, leading width=trailing width) and the fastest pulse (monopulse, leading width=zero). Intermediate leading pulse widths give intermediate response times and it can be seen that as the leading pulse width reduces below ~1/20 of the trailing width, the switching response time approaches that of the monopulse. Similar effects are observed when reducing the voltage of the leading part of the pulse as shown in FIG. 15.

The discussion will now turn to the case where the leading part of the pulse and the trailing part of the pulse are both effective for switching in opposite illumination states, so that the blanking pulse can be dispensed with. This section will also describe in more detail how measurements have been made. In these measurements the switching characteristics of a single pixel device, wholly illuminated or wholly unilluminated, have been measured.

Figure 16:
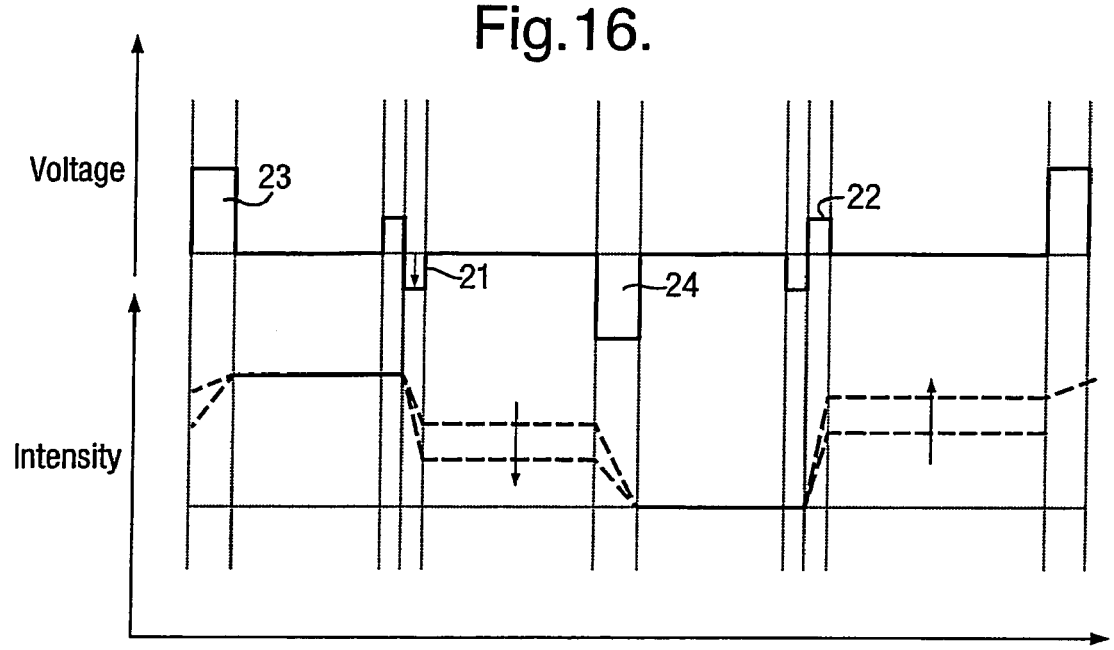
FIG. 16 illustrates a switching waveform sequence comprising a pair of blanking pulses, 14 & 15, each followed by a bipolar switching waveforms, 12 & 13, for application to an OASLM and the resulting optical response.

FIG. 16 (top) illustrates schematically two bipolar switching waveforms. For the purpose of obtaining experimental results, the sequence of waveforms (i.e. first blanking pulse, first switching waveform, second blanking pulse, second switching waveform) was applied to the control electrode of an OASLM. The advantage of this sequence is that it achieves dc balance across the OALSM device and allows the LC response to both polarities of bias to be measured. A first of the waveforms 12 has a positive leading pulse whilst the second waveform 13 has a negative leading pulse. Each switching pulse is preceded by a blanking pulse 14, 15 of the same polarity as the leading part of the switching pulse. Thus if the leading part of the pulse causes switching and the trailing part does not, this will not be detected since the state will be the same as that switched to by the blanking pulse. This measurement will only detect switching to the trailing part of the bipolar pulse. The blanking pulses have fixed amplitudes and widths, chosen to ensure full switching. Immediately following each switching pulse, the intensity provides a measure of the switching resulting from the corresponding trailing pulse. In FIG. 16, beneath the switching waveforms and blanking pulses there is illustrated the corresponding liquid crystal transmission state changes which result from the application of the waveforms. The full line following the application of each blanking pulse indicates the fully switched states while the dashed lines following each switching pulse indicate the partial switched states that exist as the switching voltage is increased from the onset of switching until full latching occurs.

In order to determine the switching characteristics of an OASLM for the illustrated switching waveforms, switching pulse widths were set and the voltage amplitude varied so that transmission levels were measured as a function of voltage at various pulse widths. From this data the voltage and pulse width for 5% and 95% switching was extracted, hence the switching characteristics in the voltage—time plane were found. Measurements were made with the "silicon side" of the OASLM both illuminated (by green light) and un-illuminated. The cell was of nominal 1.5 μm LC spacing and contained mixture SCE8 available from Clariant GmbH.

Figure 17:
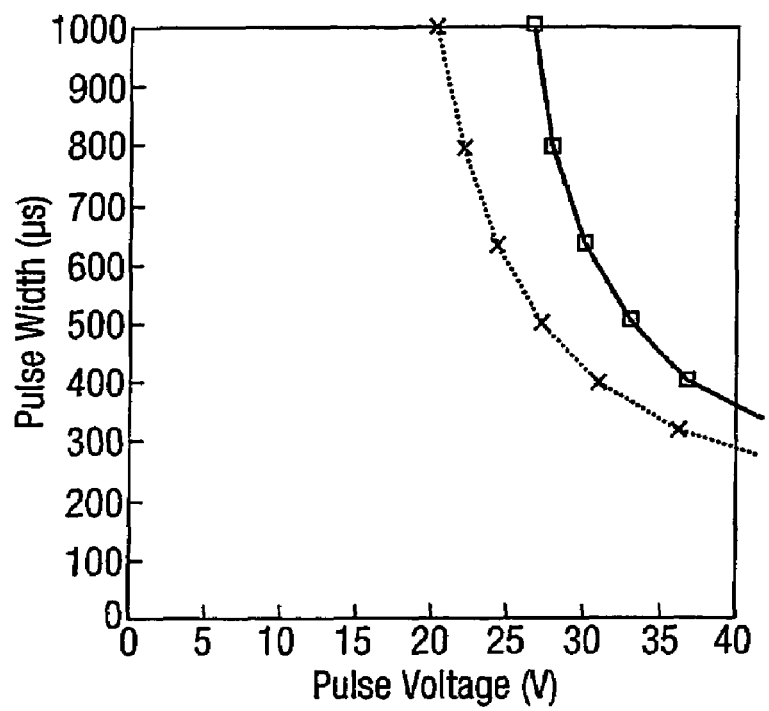
FIG. 17 shows the switching response to the second of the switching waveforms of FIG. 16, i.e. having a positive trailing pulse, not in the photosensitive direction, for the cases where the cell is unilluminated.
Figure 18:
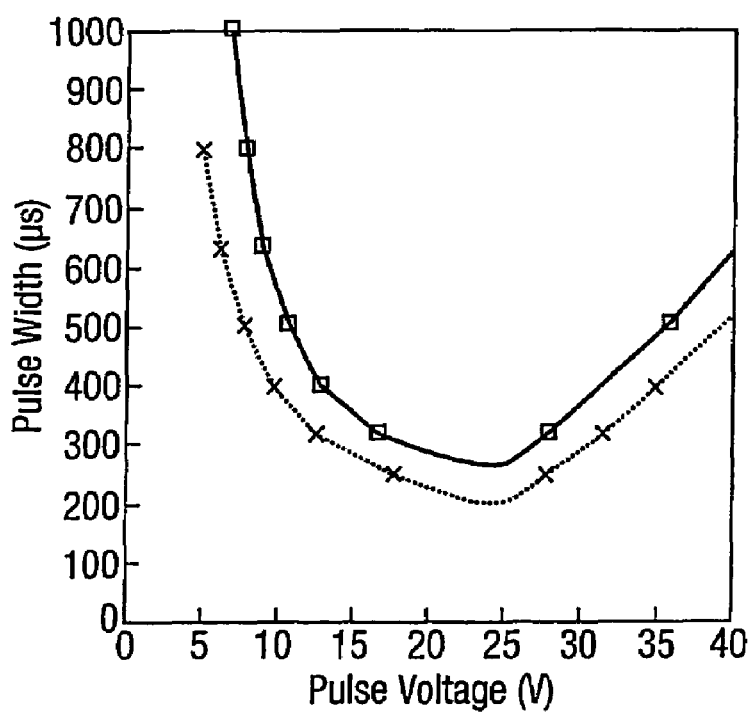
FIG. 18 shows the switching response to the second of the switching waveforms of FIG. 16, i.e. having a positive trailing pulse, not in the photosensitive direction, for the cases where the cell is illuminated.

FIG. 17 illustrates the results for the condition of no illumination for the switching pulse having a positive trailing pulse, (i.e. the second switching waveform in FIG. 16), not in the photosensitive direction, whilst FIG. 18 illustrates the results for the same waveform under the condition of illumination.

Figure 19:
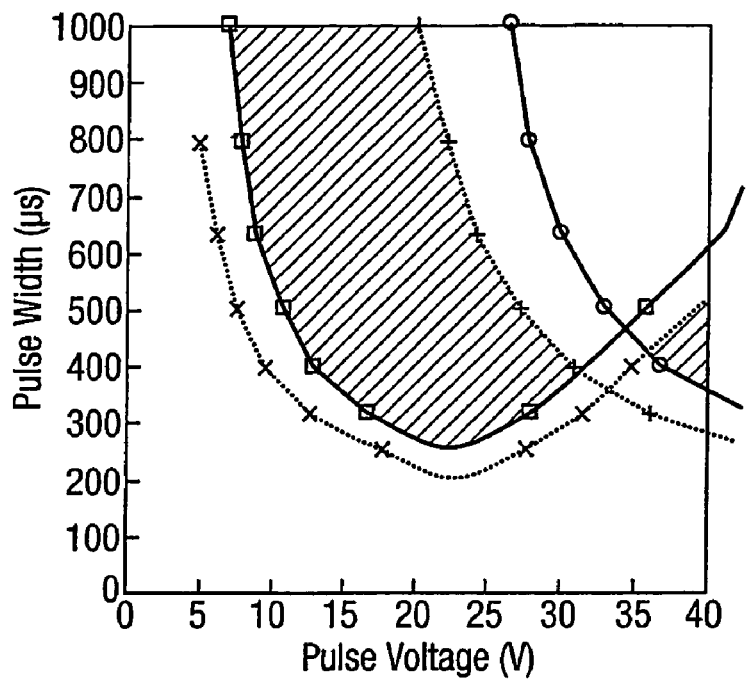
FIG. 19 is a combination of the traces of FIGS. 17 and 18 for the case of Si biased positive and on which is identified a region of good switching discrimination between illuminated and unilluminated conditions.

FIG. 19 is a combination of the traces of FIGS. 17 and 18. The areas shown cross-hatched in the Figure are those areas in which there is switching discrimination to the trailing pulse under the application of write light. The larger cross-hatched region (to the left of the minima in the switching characteristic) is that region in which the trailing pulse causes 95% or more of the illuminated area to switch (from the state set by the blanking pulse) but less than 5% of the non-illuminated area to switch. The smaller cross-hatched region (to the right of the minima in the switching characteristic) is that in which the trailing pulse causes 95% or more of the unilluminated area to switch (from the state set by the blanking pulse) but less than 5% of the illuminated area to switch. Note that comparisons on the relative size of these two regions of discrimination should not be made solely on the evidence of FIG. 19 since there is potentially a larger region of discrimination at higher voltages which has not been measured.

Figure 20:
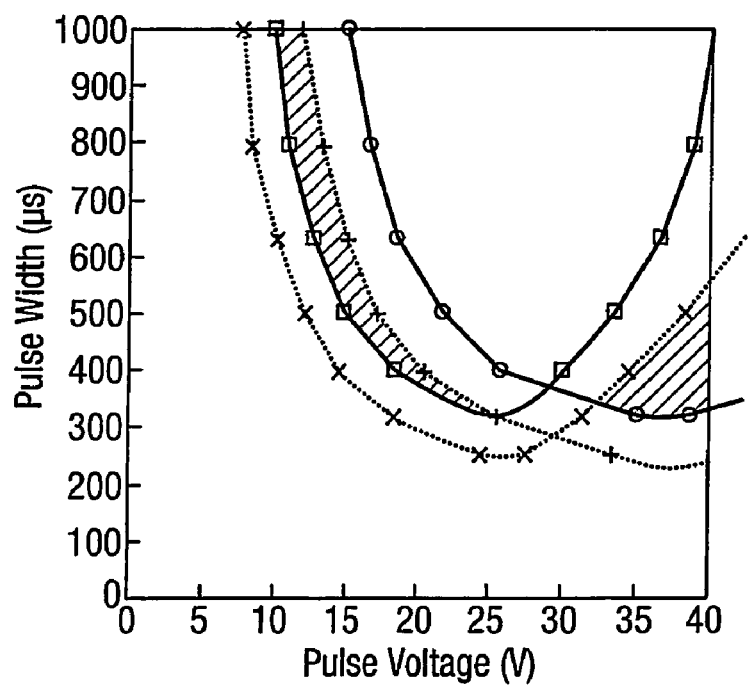
FIG. 20 shows traces corresponding to the first of the switching waveforms in FIG. 16, i.e. having a negative trailing pulse, the photosensitive direction, and on which is identified a region of good switching discrimination between illuminated and unilluminated conditions.

FIG. 20 illustrates the equivalent composite trace for the first switching waveform in FIG. 16, i.e. with Si biased negative, the photosensitive direction, with the cross-hatched areas again illustrating regions of good switching discrimination (for the trailing pulse). As above it is not possible to compare the relative sizes of the switching windows above and below the minimum in the response time.

An interesting point to note from FIGS. 19 and 20 is that the region of discrimination below the minimum in the response time is larger in FIG. 19 than in FIG. 20. It is thus the case that a switching waveform having a leading pulse in the photosensitive direction and a trailing pulse not in the photosensitive direction is preferable to a switching pulse of opposite polarity, when operating in the region below the minimum in the switching characteristic. This is contrary to conventional wisdom which has argued that switching with a bipolar waveform will be due to the trailing pulse, and that the trailing pulse must therefore be in the photosensitive direction. This result reinforces those given earlier describing the first aspect of the invention.

Figure 21:
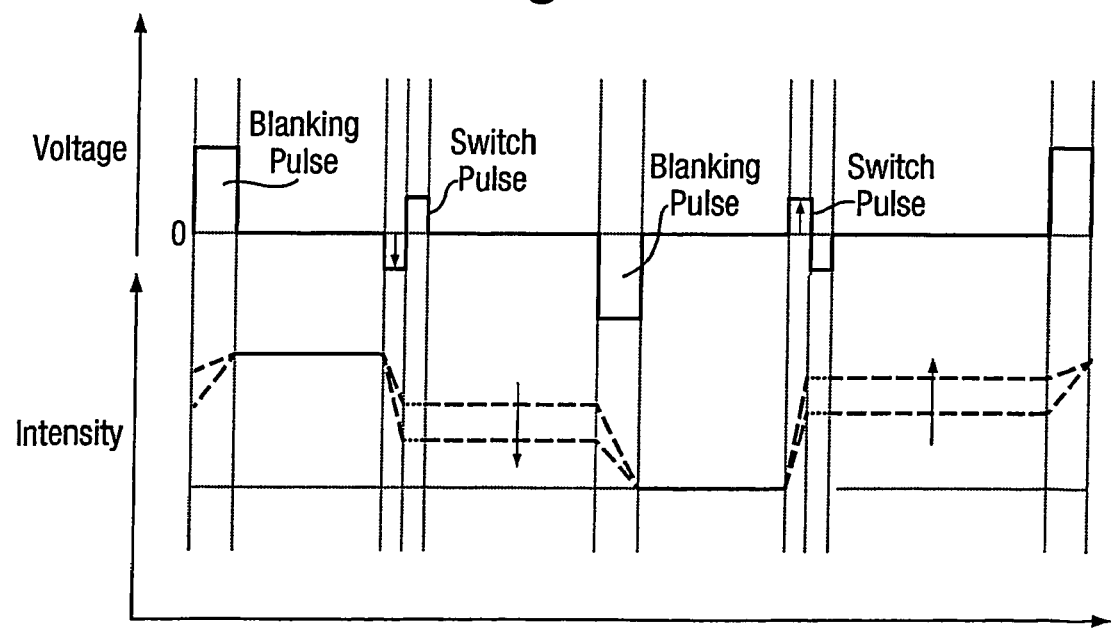
FIG. 21 illustrates a second switching waveform sequence comprising a pair of bipolar switching waveforms for application to an OASLM and the resulting optical response.

The upper trace in FIG. 21 illustrates an alternative control signal sequence (again achieving dc balance) in which, for each switching waveform, the leading pulse has a polarity opposite to that of the preceding blanking pulse, and the trailing pulse has the same polarity as the preceding blanking pulse. In this case only switching due to the leading pulse alone will be measured, i.e. if there is no switching, or if both parts of the pulse switch, the transmission will be left in the same state as switched to by the preceding blanking pulse. The corresponding change in intensity resulting from this switching sequence is illustrated in the lower trace in FIG. 21.

Figure 22:
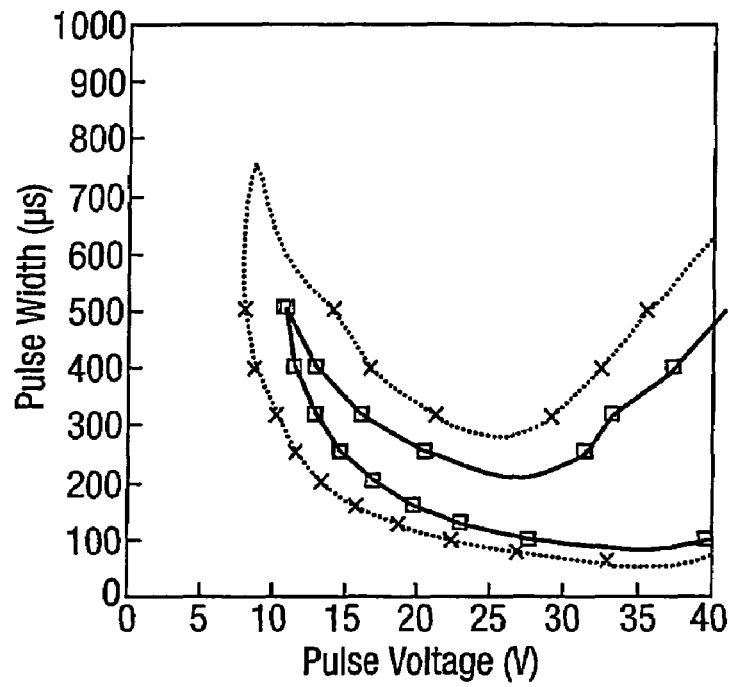
FIG. 22 shows the switching response to the second of the switching waveforms of FIG. 21, i.e. having a positive leading pulse, not in the photosensitive direction, for the cases where the cell is illuminated.
Figure 23:
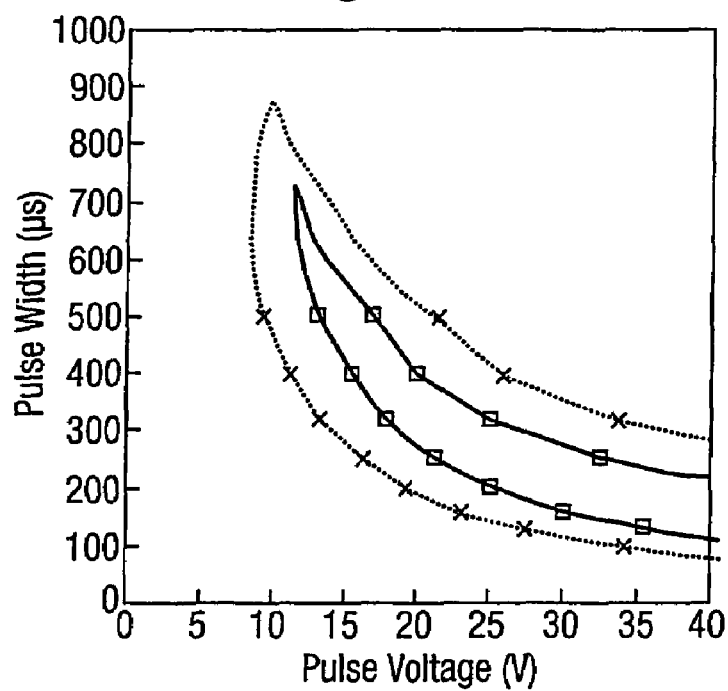
FIG. 23 shows the switching response to the second of the switching waveforms of FIG. 21, i.e. having a positive leading pulse, not in the photosensitive direction, for the cases where the cell is unilluminated.

The operating regions for the leading pulse are more complex than those for the trailing pulse since, for a particular pulse width, trailing pulse switching effectively cuts off leading pulse switching above a certain voltage. This leads to an enclosed region of switching. FIG. 22 illustrates the results for the condition of illumination for the switching pulse having a positive leading pulse, (i.e. the second switching waveform in FIG. 21), not the photosensitive direction, and the area enclosed by the lines is the switching region. FIG. 23 illustrates the results for the same waveform under the condition of no illumination.

Figure 24:
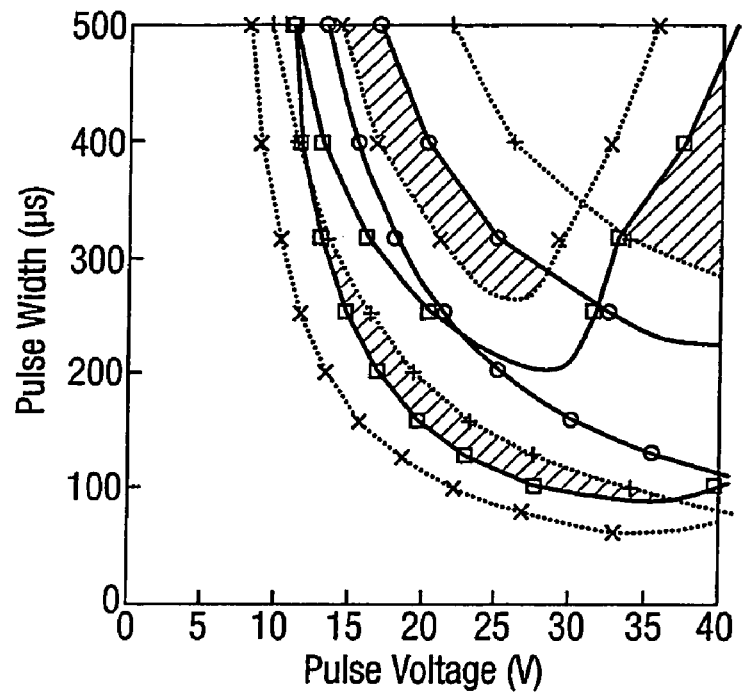
FIG. 24 is a combination of the traces of FIGS. 21 and 22 for the case of positive leading pulse and on which is identified a region of good switching discrimination between illuminated and unilluminated conditions.

FIG. 24 illustrates a composite trace for the data of FIGS. 22 and 23. The cross-hatched areas are those in which good switching discrimination can be achieved for the leading pulse.

Figure 25:
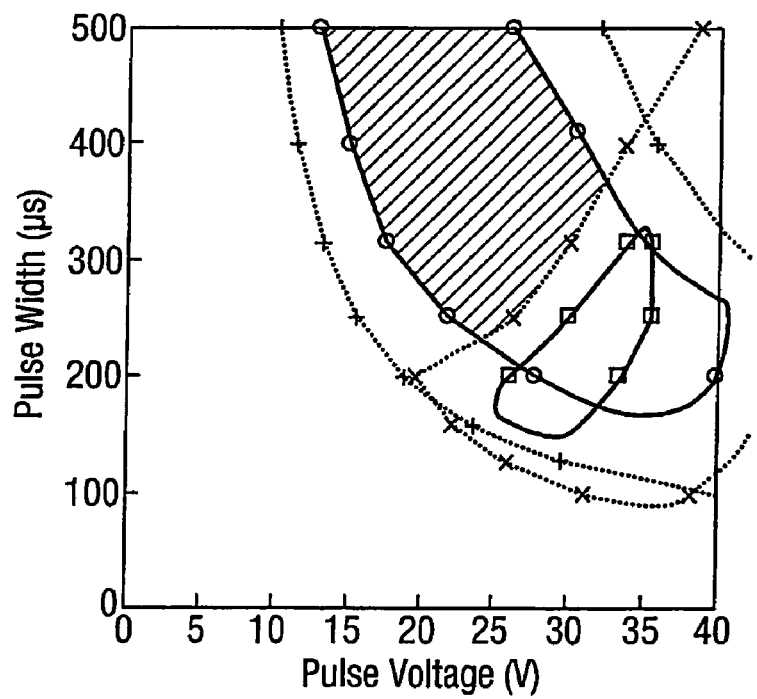
FIG. 25 shows a combination trace for the case of negative leading pulse and on which is identified a region of good switching discrimination between illuminated and unilluminated conditions.

FIG. 25 is the equivalent composite trace for the first switching waveform of FIG. 21 (i.e. having a negative leading pulse and a positive trailing pulse).

From these Figures it can be seen that the operating window is larger when the leading pulse is in the photosensitive direction. This is what would be expected since the leading pulse is effectively behaving as a monopulse, there is no immediately preceding pulse to influence the director and move it from its relaxed position. The trailing pulse influences the operating window since it will switch back from the state switched to by leading pulse under certain conditions of voltage and pulse width.

As already described, the traces of FIGS. 19 and 20 illustrate the switching characteristics of the trailing pulse of respective bipolar switching waveforms, whilst FIGS. 24 and 25 illustrate the switching characteristics of the leading pulse of respective bipolar switching waveforms. These two sets of characteristics can be used to design a bipolar switching waveform which provides switching (of good discrimination) to both leading and trailing parts of the waveform. In particular, the characteristics can be used to design a waveform which provides switching to one part which reinforces the state imposed by the blanking pulse (in appropriate regions-illuminated or unilluminated) and switching to the other part to the opposite state (in appropriate regions—illuminated or unilluminated).

Figure 26:
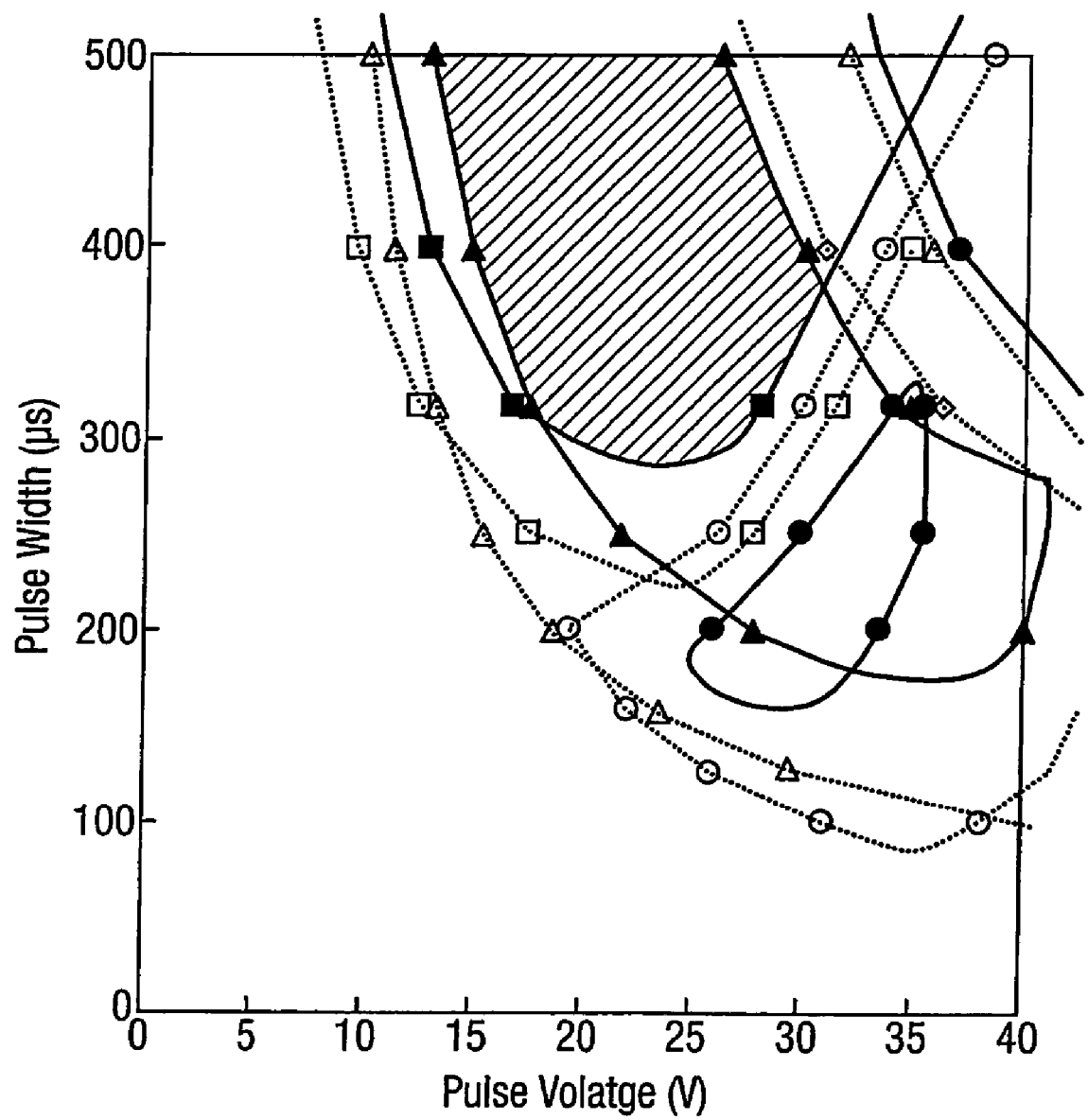
FIG. 26 shows a combination trace for the case of negative leading pulse and positive trailing pulse and on which is identified a region of good switching discrimination due to leading pulse unilluminated switching and trailing pulse illuminated switching.
Figure 27:
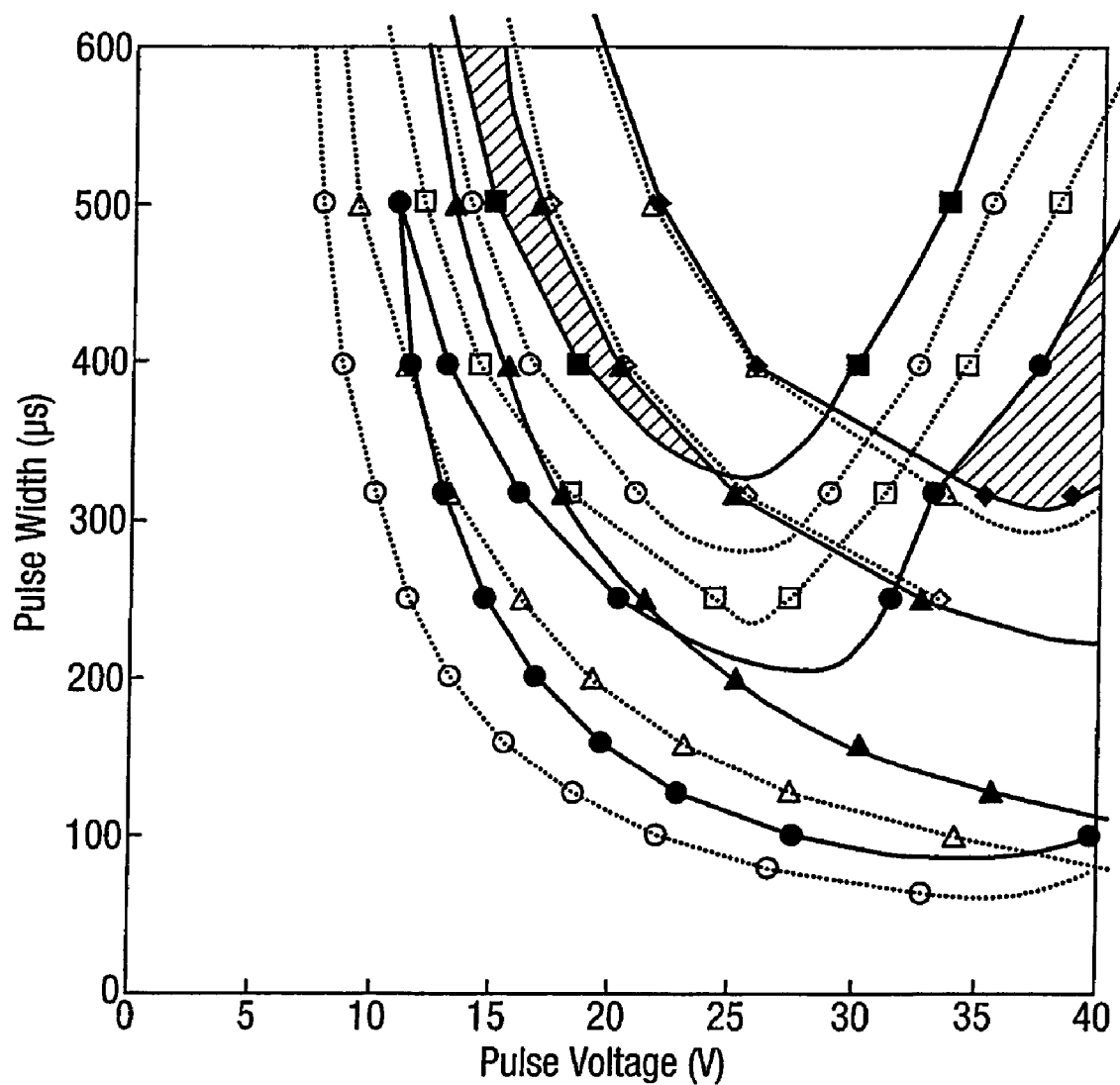
FIG. 27 shows a combination trace for the case of positive leading pulse and negative trailing pulse and on which are identified two regions of good switching discrimination, one due to leading pulse unilluminated switching and trailing pulse illuminated switching, the other due to leading pulse illuminated switching and trailing pulse unilluminated switching.

Considering firstly a bipolar switching waveform having a negative leading pulse and a positive trailing pulse (the first switching waveform in FIG. 21 and the second waveform in FIG. 16), FIG. 26 combines the relevant traces of FIGS. 19 and 25 to illustrate the combined switching characteristics (to both the trailing and leading pulses) for this bipolar switching waveform. Similarly, FIG. 27 combines the traces of FIGS. 20 and 24 to illustrate the combined switching characteristics (to both the trailing and leading pulses) for a bipolar switching waveform having a positive leading pulse and a negative trailing pulse. The cross-hatched regions in FIGS. 26 and 27 illustrate only those operating regions in which switching occurs to both leading and trailing pulses with good discrimination; regions of discrimination to one pulse only are not indicated.

Operating within the cross-hatched areas of FIG. 26 (corresponding to a switching waveform having a negative leading pulse and a positive trailing pulse), the following switching sequence can be assumed.

For the negative leading part—
Non-illuminated areas—leading pulse (switching area bounded by "Δ")—switch—this reinforces the 'down' state already existing due to the blanking pulse, by moving the director from its relaxed position to the 'fully switched' position.
Illuminated areas—leading pulse (switching area bounded by "o")—non-switch—this leaves the liquid crystal in the 'down' state, but in a relaxed director state since there is no switching effect.
Positive trailing part—
Non Illuminated areas—trailing pulse (switching area bounded by " ◊ ")—non-switch—this leaves the director in the 'down' state. Even if the pulse was in the partial switch region, the fact that the director is in the fully switched state makes switching more difficult than from the relaxed state. There is no tendency of the non-illuminated areas to switch to the 'up' state,
Illuminated—the trailing pulse (switching area bounded by " ")—switch—switches the liquid in the illuminated area to the 'up' state.

Note that even if there was no blanking pulse, and whatever the state of the liquid crystal before application of the bipolar pulse, it will always be switched to the desired state since—
The non-illuminated part is switched 'down' during the leading part of the pulse (if not already in that state)
The illuminated part is switched 'up' in the trailing part of the pulse.

A similar explanation can be applied to the operating regions illustrated in FIG. 27. The operating region within the cross-hatched area above 35V corresponds to a switching waveform having a negative trailing pulse switching where unilluminated and a positive leading pulse switching where illuminated; the cross-hatched operating region below 25V corresponds to a switching waveform having a negative trailing pulse switching where illuminated and a positive leading pulse switching where unilluminated.

The results disclosed above demonstrate that the use of a bipolar pulse to switch the liquid crystal of an OASLM results in—
a broader operating range than is achieved when switching with a monopolar pulse, irrespective of the polarity.
Trailing pulse switching bipolar pulse operation results in greater discrimination when the bias of the trailing pulse is not in the photosensitive direction.
Operation at voltages greater than $v_{min}$ results in a wider operating region than operating below $v_{min}$.
A region of switching to each part of a bipolar pulse which leads to both illuminated and non-illuminated regions of the liquid crystal switching to different states. This is highly desirable as it leads to operation which does not need a blanking pulse and/or gives improved discrimination to illumination.

Figure 28A:
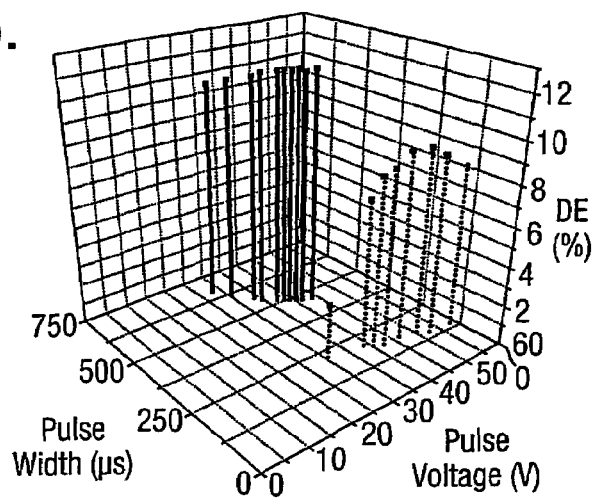
FIG. 28 shows three plots of diffraction efficiency for an OASLM device having gratings of fringe pitch 26.8 µm (a), 16.1 µm (b) and 11.1 µm (c) written to the Si side of the device.
Figure 28B:
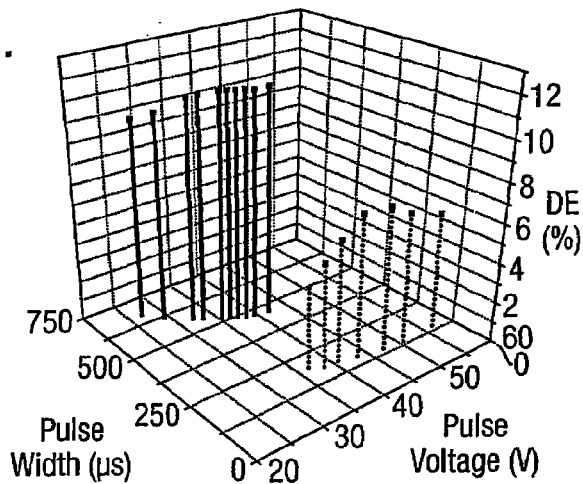
Figure 28C:
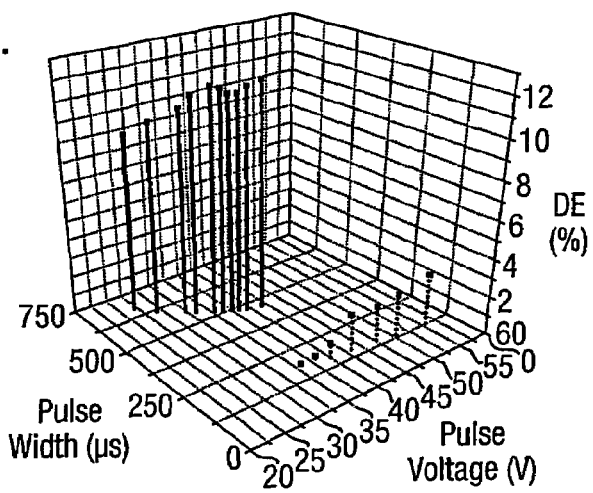

The effectiveness of this technique can be further demonstrated by reference to plots of diffraction efficiency, see FIG. 28. In this experiment a diffraction grating was projected onto the Si side of the OASLM and the diffraction efficiency of the image diffracted from the LC side of the OALSM was measured. Three different sets of spacing of the diffraction grating were used. The Figure shows diffraction efficiency represented as vertical bars on a 3-D plot which are plotted on a base plane of voltage—time. Bars which are dotted represent regions in which only one part of a bipolar pulse is contributing to switching, i.e. either trailing pulse switching or leading pulse switching. Bars which are full lines represent regions in which switching is taking place due to both parts of the bipolar pulse. It can be seen that the efficiencies in the regions where both parts of the bipolar pulse are contributing to switching are greater than those in the regions where only one part of a bipolar pulse was contributing to switching; furthermore as the diffraction grating pitch is reduced the diffraction efficiency is maintained where both parts of the bipolar pulse are contributing to switching, whereas where only one part of a bipolar pulse is contributing to switching the efficiency reduces as the grating pitch is reduced. This is very important for the replay of holographic images where micron scale pixels are required.

It will be appreciated by the person of skill in the art that various modifications may be made to the above described embodiments without departing from the scope of the present invention.

The invention claimed is:

1. A method of controlling the switching of an optically addressable spatial light modulator (OASLM) having a photosensitive layer able to be driven in both a photosensitive direction and non-photosensitive direction, the method comprising:
applying a bipolar switching waveform to control electrodes of the OASLM during a write cycle such that a leading pulse of the waveform applies a voltage across the OASLM which is in the photosensitive direction and a trailing pulse applies a voltage which is not in the photosensitive direction, wherein the trailing pulse causes switching between stable states of the OASLM.

2. The method according to claim 1, wherein the amplitude of the leading pulse is less than that of the trailing pulse.

3. The method according to claim 1, wherein the shape and amplitude of the bipolar switching waveform are such that the leading pulse causes substantially no switching between stable states.

4. The method according to claim 1, wherein the bipolar switching waveform includes no more than two sequential pulses.

5. The method according to claim 1, wherein the duration of the leading pulse is less than that of the trailing pulse.

6. The method according to claim 1, wherein the bipolar switching waveform causes unilluminated areas to switch and does not switch illuminated areas.

7. A method of controlling the switching of an optically addressable spatial light modulator (OASLM) having a photosensitive layer able to be driven in both a photosensitive direction and a non-photosensitive direction, the method comprising:
   applying a blanking pulse in the photosensitive direction to cause the OASLM to switch to a first state;
   applying a bipolar switching waveform to control electrodes of the OASLM during each write cycle, wherein a leading pulse of the switching waveform is also applied in the photosensitive direction, and wherein a trailing pulse of the bipolar waveform is applied in the non-photosensitive direction and causes areas of the OASLM to substantially switch from the first state to an opposite state.

8. The method according to claim 7, wherein the pulse amplitudes and widths are chosen to lie within that region of pulse amplitude/width space which is substantially bounded by:
   a) a line defining between 95% and 100% switching of illuminated areas to the leading pulse of the bipolar waveform; and
   b) a line defining between 0% and 5% switching of unilluminated areas to the trailing pulse of the bipolar waveform.

9. The method according to claim 7, wherein the pulse amplitudes and widths are chosen to lie within that region of pulse amplitude/width space which is substantially bounded by:
   a) a line defining between 95% and 100% switching of unilluminated areas to the leading pulse of the bipolar waveform; and
   b) a line defining between 0% and 5% switching of illuminated areas to the trailing pulse of the bipolar waveform.

10. The method according to claim 7, wherein the bipolar switching waveform is preceded by a blanking pulse which switches the entire OASLM to an illuminated state.

11. The method according to claim 7, wherein the bipolar switching waveform is preceded by a blanking pulse which switches the entire OASLM to a nonilluminated state.

12. The method according to claim 7, wherein the blanking pulse is completed prior to the leading pulse.

13. An optically addressable spatial light modulator (OASLM) comprising:
   a photosensitive layer able to be driven in both a photosensitive direction and a non-photosensitive direction,
   wherein switching between stable states is performed by applying an asymmetric bipolar switching waveform to control electrodes of the OASLM during a write cycle, and wherein a switching between stable states is caused by a trailing pulse of the bipolar switching waveform that includes a polarity in the non-photosensitive direction.

14. The OASLM according to claim 13, wherein the polarity of the leading pulse of the bipolar waveform is in the photosensitive direction.

15. The OASLM according to claim 13, wherein the pulse width ratio between the leading pulse and the trailing pulse is at least 1:4.

16. The OASLM according to claim 13, including a liquid crystal having a response time for switching between first and second states which depends upon the voltage across the liquid crystal layer, the response time having a minimum at a given voltage.

17. The OASLM according to claim 13, wherein the amplitude of the leading pulse is less than that of the trailing pulse.

18. A display system comprising:
   an optically addressable spatial light modulator (OASLM) having a photosensitive layer able to be driven in both a photosensitive direction and a non-photosensitive direction;
   means for applying a write light signal to a first surface of the OASLM;
   means for applying a read light signal to a second surface of the OASLM; and
   OASLM control means for applying a bipolar switching waveform to control electrodes of the OASLM during each write cycle such that in use a leading pulse of the waveform applies a voltage across the OASLM which is in the photosensitive direction, and a trailing pulse of the waveform applies a voltage which is not in the photosensitive direction, where the trailing pulse causes the electrodes to switch between stable states.

19. The system according to claim 18, wherein the amplitude of the leading pulse is less than that of the trailing pulse.

20. The system according to claim 18, wherein the shape and amplitude of the bipolar switching waveform are such that the leading pulse causes substantially no switching between stable states.

21. The system according to claim 18, wherein the duration of the leading pulse is less than that of the trailing pulse.

* * * * *